US011155681B2

(12) United States Patent
Yang et al.

(10) Patent No.: US 11,155,681 B2
(45) Date of Patent: Oct. 26, 2021

(54) MICROLATTICE STRUCTURES INCLUDING FLAME RETARDANT MATERIALS AND COMPOSITIONS AND METHODS FOR FORMING THE SAME

(71) Applicant: HRL LABORATORIES, LLC, Malibu, CA (US)

(72) Inventors: Sophia S. Yang, Los Angeles, CA (US); Eric C. Clough, Santa Monica, CA (US); Thomas I. Boundy, Malibu, CA (US); Andrew P. Nowak, Los Angeles, CA (US); Zak C. Eckel, Calabasas, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/518,725

(22) Filed: Jul. 22, 2019

(65) Prior Publication Data
US 2019/0345290 A1 Nov. 14, 2019

Related U.S. Application Data

(62) Division of application No. 14/826,182, filed on Aug. 13, 2015, now Pat. No. 10,407,550.
(Continued)

(51) Int. Cl.
*C08G 75/00* (2006.01)
*C09D 181/00* (2006.01)
*C09K 21/00* (2006.01)

(52) U.S. Cl.
CPC ........... *C08G 75/00* (2013.01); *C09D 181/00* (2013.01); *C09K 21/00* (2013.01)

(58) Field of Classification Search
CPC ...... C08G 75/00; C09D 181/00; C09K 21/00; C08K 5/10
See application file for complete search history.

(56) References Cited

U.S. PATENT DOCUMENTS

| 4,997,702 A | 3/1991 | Gazit et al. |
| 6,174,943 B1 | 1/2001 | Matsumoto et al. |

(Continued)

FOREIGN PATENT DOCUMENTS

| EP | 0629665 A2 | 12/1994 |
| WO | WO 2007/073498 A2 | 11/2004 |
| WO | WO 2012/057618 A1 | 5/2012 |

OTHER PUBLICATIONS

Cakmakci, E. et al., "Flame retardant thiol-ene photocured coatings", *Reactive and Functional Polymers*, Elsevier, vol. 71, No. 1, Jan. 1, 2011, pp. 36-41.
(Continued)

*Primary Examiner* — Jessica M Roswell
(74) *Attorney, Agent, or Firm* — Lewis Roca Rothgerber Christie, LLP

(57) ABSTRACT

A composition for forming a microlattice structure includes a photopolymerizable compound and a flame retardant material. A microlattice structure includes a plurality of struts interconnected at a plurality of nodes, the struts including: a copolymer including a reaction product of a photopolymerizable compound and a flame retardant material. A microlattice structure includes a plurality of struts interconnected at a plurality of nodes, the struts including: a polymer including a reaction product of a photopolymerizable compound; and a flame retardant material.

14 Claims, 18 Drawing Sheets

Related U.S. Application Data

(60) Provisional application No. 62/037,552, filed on Aug. 14, 2014.

(56) References Cited

U.S. PATENT DOCUMENTS

| | | | |
|---|---|---|---|
| 6,255,371 | B1 | 7/2001 | Schlosser et al. |
| 6,642,284 | B2 | 11/2003 | Thewes et al. |
| 6,900,269 | B2 | 5/2005 | Hwang et al. |
| 7,382,959 | B1 | 6/2008 | Jacobsen |
| 7,960,445 | B2 | 6/2011 | Jacobine et al. |
| 8,197,930 | B1 | 6/2012 | Jacobsen et al. |
| 8,470,916 | B2 | 6/2013 | Glauner et al. |
| 2004/0235992 | A1 | 11/2004 | Okada et al. |
| 2006/0068194 | A1 | 3/2006 | Feldstein |
| 2007/0259980 | A1* | 11/2007 | Park ............ C08J 9/0004 521/85 |
| 2008/0286690 | A1 | 11/2008 | Kamata et al. |
| 2009/0292038 | A1 | 11/2009 | Tsutomu |
| 2010/0080920 | A1 | 4/2010 | Lagrange et al. |
| 2010/0184913 | A1 | 7/2010 | Ebbrecht et al. |
| 2014/0027739 | A1 | 1/2014 | van de Weijer et al. |
| 2014/0106979 | A1 | 4/2014 | Lau et al. |

OTHER PUBLICATIONS

Chinese Office Action dated Jan. 11, 2019 for corresponding CN Application No. 201580043532.6, with machine English Translation (21 pages).

Chinese Office action dated May 15, 2018 for Application No. 2015800435326 (10 pages), and partial translation of the relevant portions (2 pages).

Choate, M., "High Tg Bromine-Free Laminates for PWB Applications," IPC Printed Circuits EXPO, 2001, pp. S11-2-1 to S11-2-5.

Extended European Search Report for corresponding European application No. 15831355.1, dated Mar. 12, 2018 (9 pages).

Hoyle, Charles E., et al., "Thiol-Ene Click Chemistry," Angewandte Chemie International Edition, 2010, vol. 49, No. 9, pp. 1540-1573.

International Preliminary Report on Patentability issued in PCT/US2015/045161, dated Dec. 1, 2016, 22 pages.

Laoutid, F., et al., "New prospects in flame retardant polymer materials: From fundamentals to nanocomposites," Materials Science and Engineering R., vol. 63, 2009, pp. 100-125.

PCT International Search Report and Written Opinion of the International Searching Authority dated Nov. 26, 2015 of the corresponding International Application No. PCT/US2015/045161, noting listed references in this IDS.

Rakotomalala, M., et al., "Recent Developments in Halogen Free Flame Retardants for Epoxy Resins for Electrical and Electronic Applications," Materials 2010, vol. 3, pp. 4300-4327.

* cited by examiner

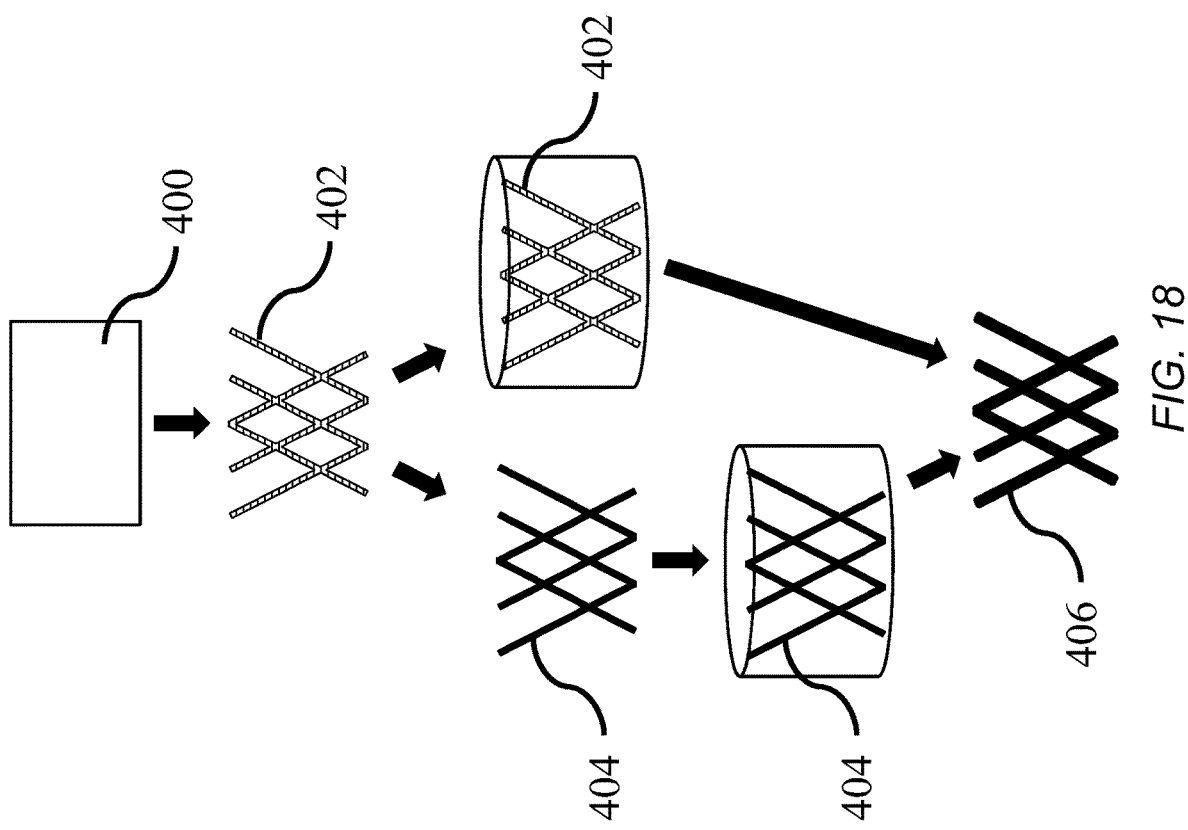

MICROLATTICE STRUCTURES INCLUDING FLAME RETARDANT MATERIALS AND COMPOSITIONS AND METHODS FOR FORMING THE SAME

CROSS-REFERENCE TO RELATED APPLICATION(S)

This application is a divisional of U.S. patent application Ser. No. 14/826,182, filed on Aug. 13, 2015, which claims priority to and the benefit of related U.S. Provisional Application Ser. No. 62/037,552, filed in the U.S. Patent and Trademark Office on Aug. 14, 2014, the entire contents of both of which are incorporated herein by reference.

BACKGROUND

Flame retardant polymers are useful for various applications such as those that have frequent and/or close contact with humans and that may be exposed to open flames. For example, flame retardant polymers may be used in transportation applications, consumer goods, and the like. Previously, halogenated compounds (e.g., organohalogens) have been used as flame retardants, but, because those halogenated compounds may produce halogen gas and/or halogen compounds that are environmental toxins and may corrode surrounding materials, there has been a push to move away from such halogenated compounds. For example, the Stockholm Convention on Persistent Organic Pollutants bans the use of 22 organohalogens, many of which are used for flame retardant purposes. Additionally, the Restriction of Hazardous Substances (RoHS) Directive of the European Union also bans the use of certain organohalogens due to environmental concerns.

While research has been conducted into non-halogen flame retardant compounds, these compounds have processing constraints that lead to high loading levels of the compounds. Additionally, existing non-halogen flame retardant compounds are used in molding processes in which the architecture of the resultant part may be controlled, but the architecture of the chemistry within the part is not controlled.

SUMMARY

Aspects of embodiments of the present disclosure are directed toward flame retardant components included in a microlattice form factor, and compositions and methods for forming the same.

Aspects of embodiments of the present disclosure are directed toward non-halogen flame retardant materials that may be used at lower loading levels. Aspects of embodiments of the present disclosure are also directed toward methods for tailoring the architecture of a part as well as the location of chemical compounds in the part.

According to an embodiment of the present disclosure, a composition for forming a microlattice structure, includes: a photopolymerizable compound; and a flame retardant material.

The flame retardant material may include a photopolymerizable functional group, and the flame retardant material and the photopolymerizable compound may be adapted to copolymerize with each other.

According to another embodiment, a microlattice structure includes: a plurality of struts interconnected at a plurality of nodes, the struts including: a copolymer including a reaction product of photopolymerizable compound and a flame retardant material.

According to another embodiment, a microlattice structure includes: a plurality of struts interconnected at a plurality of nodes, the struts including: a polymer including a reaction product of a photopolymerizable compound; and a flame retardant material.

According to another embodiment, a method of forming a microlattice structure includes: exposing a composition including a photopolymerizable compound and a flame retardant material to collimated light to form a precursor-microlattice structure; and curing the precursor-micro-lattice structure to form the microlattice structure.

According to another embodiment, a method of forming a microlattice structure includes: exposing a composition including a photopolymerizable compound to collimated light to form a precursor-microlattice structure; adding a flame retardant material to the precursor-micro-lattice structure; and curing the precursor-microlattice structure to form the micro-lattice structure.

The adding of the flame retardant material may include forming a coating including the flame retardant material on the polymer.

The adding of the flame retardant material may be performed subsequent to the curing of the precursor-microlattice structure.

According to any of the above embodiments, the flame retardant material of the coating may include a material selected from metals, ceramics, silicon, silicones, silica, nanoclay, nanoparticles, nanofibers, and mixtures thereof.

According to any of the above embodiments, the flame retardant material includes a photopolymerizable functional group and the exposing of the composition copolymerizes the flame retardant material with the photopolymerizable compound.

According to any of the above embodiments, the exposing of the composition polymerizes the photopolymerizable compound to form a polymer.

According to any of the above embodiments, the curing of the precursor-micro-lattice structure may form a chemical bond between the flame retardant material and the polymer.

According to any of the above embodiments, the chemical bond may be formed by a reaction of a first non-photopolymerizable functional group of the polymer and a second non-photopolymerizable functional bonded to the flame retardant material.

According to any of the above embodiments, the curing of the precursor-micro-lattice structure may include thermal curing or moisture curing.

The photopolymerizable functional group of the flame retardant material according to any of the above embodiments may be selected from a thiol group, an alkenyl group, an alkynyl group, an acrylate group, an epoxy group, and a methacrylate group.

The flame retardant material according to any of the above embodiments may be selected from a phosphate, a phosphonate, a phosphinate, and a mixture thereof.

The flame retardant material according to any of the above embodiments may be included in the composition in an amount of 1 to 33 wt % based on the total weight of the composition.

The flame retardant material according to any of the above embodiments may include particles including a material selected from alumina trihydrate, ammonium polyphosphate, red phosphorous, an organic phosphinate, melamine polyphosphate, borates, expandable graphite, a phosphorous based oligomer, and a mixture thereof.

According to any of the above embodiments, the photopolymerizable compound may include a photopolymerizable functional group and a first non-photopolymerizable functional group, a second non-photopolymerizable functional group may be bonded to the flame retardant material, and the first non-photopolymerizable functional group and the second non-photopolymerizable functional group may be adapted to react with each other upon curing.

According to any of the above embodiments, the first non-photopolymerizable functional group may be selected from an isocyanate group, a hydroxyl group, an amine group, a carboxylic acid group, an epoxy group, a silyl ether, and a combination thereof, and the second non-photopolymerizable functional group may be selected from an isocyanate group, a hydroxyl group, an amine group, a carboxylic acid group, an epoxy group, and a combination thereof.

According to any of the above embodiments, the photopolymerizable compound may include a first compound including an unsaturated carbon-carbon bond and a second compound including a terminal thiol group.

According to any of the above embodiments, the first compound including the unsaturated carbon-carbon bond may be selected from the group consisting of ethylene, substituted olefins, 1,3-dienes, styrene, α-methyl styrene, vinyl esters, acrylates, methacrylates, acrylonitriles, acrylamides, N-vinyl carbazoles, N-vinyl pyrrolidone, and mixtures thereof.

According to any of the above embodiments, the second compound including the terminal thiol group may be selected from the group consisting of pentaerythritol-tetra-3-mercaptopropionate, trimethylolpropane tris(3-mercaptopropionate), 1,6-hexanedithiol, trimethylolpropane tris(2-mercaptoacetate), ethoxylated trimethylolpropane tris(3-mercaptopropionate), glycol di-3-mercaptopropionate, and mixtures thereof.

According to any of the above embodiments, the first compound including the unsaturated carbon-carbon bond may be included in the composition in an amount of 10 to 99 wt %, and the second compound including the terminal thiol group may be included in the composition in an amount of 10 to 99 wt %, based on the total weight of the composition.

According to any of the embodiments above, the polymer may at least partially surround the flame retardant material.

According to any of the embodiments above, the struts include a coating including the flame retardant material on the polymer.

According to any of the above embodiments, the flame retardant material may be attached to the polymer by a chemical bond.

According to any of the above embodiments, the chemical bond may be formed by a reaction of a first non-photopolymerizable functional group of the photopolymerizable compound and a second non-photopolymerizable functional group bonded to the flame retardant material.

According to any of the above embodiments, the first non-photopolymerizable functional group may be selected from an isocyanate group, a hydroxyl group, an amine group, a carboxylic acid group, an epoxy group, a silyl ether, and a combination thereof, and the second non-photopolymerizable functional group may be selected from an isocyanate group, a hydroxyl group, an amine group, a carboxylic acid group, an epoxy group, and a combination thereof.

BRIEF DESCRIPTION OF THE DRAWINGS

The accompanying drawings, together with the specification, illustrate embodiments of the present disclosure, and, together with the description, serve to explain the principles of the present invention.

FIGS. 17 and 18 are schematic diagrams illustrating embodiments of reactions for forming microlattice structures.

DETAILED DESCRIPTION

Figure 1:
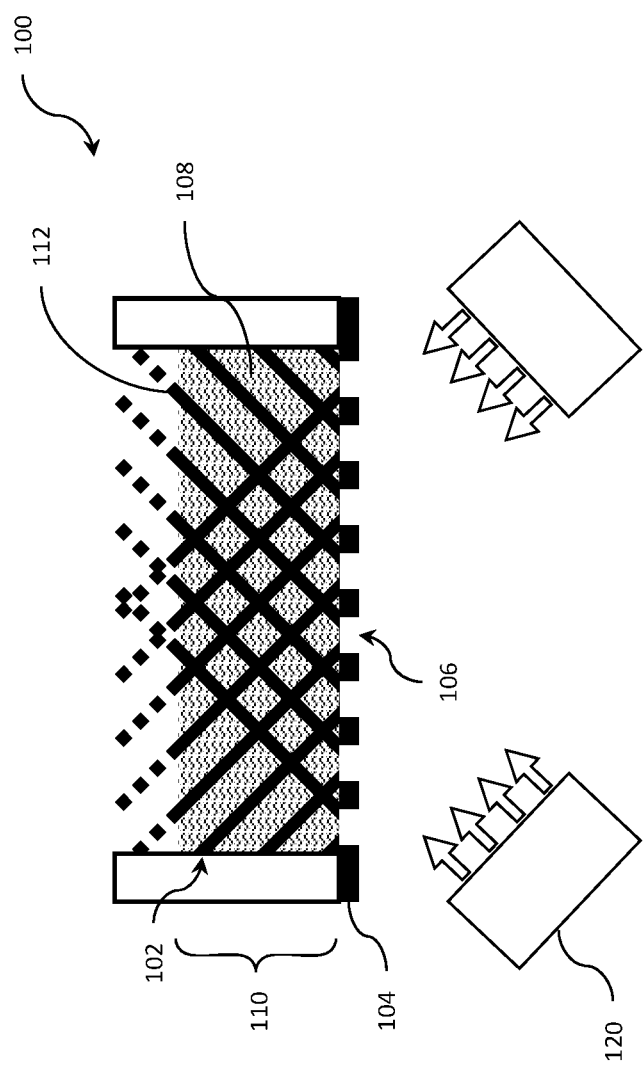
FIG. 1 is a schematic cross-sectional diagram illustrating an embodiment of a system for forming a microlattice structure.

In the following detailed description, only certain embodiments of the present disclosure are shown and described, by way of illustration. As those skilled in the art would recognize, the invention may be embodied in many different forms and should not be construed as being limited to the embodiments set forth herein. Accordingly, the drawings and description are to be regarded as illustrative in nature, and not restrictive.

Embodiments of the present disclosure relate to a microlattice structure including a flame retardant material (e.g., a non-halogen flame retardant material), and compositions and methods for forming the same. As used herein, a flame retardant material is any material that reduces, suppresses, or delays the formation of flames (or fire) to prevent or reduce the formation or spread of fire. The flame retardant material may include, for example, a particle, a precursor utilized to form a polymer (e.g., a copolymer, prepolymer or oligomer), a portion of the polymer (e.g., the portion of the polymer that includes the reacted precursor), or a coating.

Accordingly, the flame retardant material may be included in and/or on, struts (e.g., polymer waveguides) of the microlattice structure. Including the flame retardant material in and/or on the struts of the microlattice structure provides architectural control for tailoring the chemistry of the microlattice structure inside, and at the surface of, the struts. For example, the struts of the microlattice structure may be formed by copolymerizing the flame retardant material with another compound (e.g., a photopolymerizable compound). In such embodiments, the struts of the microlattice include (or are defined by) a copolymer including the flame retardant material (e.g., a copolymerized reaction product of the flame retardant material and the other compound).

Additionally, or alternatively, the flame retardant material may be physically trapped (or entrained) in the struts of the microlattice structure. For example, the flame retardant material may be encased in a polymer that is included in (or defines) the struts. In some embodiments, the polymer may be formed (e.g., polymerized) to at least partially surround the flame retardant material by forming (e.g., polymerizing) a compound (e.g., a photopolymerizable compound) in the presence of the flame retardant material, thereby at least partially surrounding the flame retardant material (or trapping the particles in the polymer).

Additionally, or alternatively, the flame retardant material may be incorporated into the microlattice structure through orthogonal chemistry (e.g., by way of orthogonal chemical reactions). The orthogonal chemistry may utilize, for example, a first reaction, and a second reaction (e.g., an orthogonal reaction) to form the microlattice structure. The first reaction (e.g., a photopolymerization reaction such as a UV-initiated, free-radical or ionic reaction) forms a precursor-microlattice structure, and the second reaction, which is different from (e.g., orthogonal to) the first reaction, forms the microlattice structure from the precursor-microlattice structure. For example, the second reaction may be a photopolymerization reaction that is different from the first reaction (e.g., is initiated at a wavelength that is different than that of the first reaction), a thermal curing reaction, or a moisture curing reaction (e.g., a reaction of isocyanate terminated monomers, oligomers, prepolymers, or polymers that are adapted to cure in the presence of ambient water).

Accordingly, in some embodiments, the flame retardant material includes a functional group that reacts during the second reaction, but does not react during the first reaction that forms the precursor-microlattice structure. The first reaction forms "green" struts of the precursor-micro-lattice structure, and the flame retardant material may be bonded to the "green" struts of the precursor-microlattice by way of the second reaction, which may also cross-link the precursor-micro-lattice structure to form the microlattice structure. The precursor-microlattice may be formed in the presence of the flame retardant material, and/or the flame retardant material may be added to the precursor-microlattice structure after the first reaction is performed. In embodiments of the orthogonal chemistry process, the "green" struts of the microlattice structure may be formed from a compound (e.g., a photopolymerizable compound) including a photopolymerizable functional group and an orthogonal functional group (e.g., a functional group that reacts during the second reaction, but does not react during the first reaction). Utilizing monomers, oligomers, prepolymers and/or polymers having a first functional group that reacts during the first reaction and a second functional group that reacts during the second reaction provides a cross-linked structure (or a higher cross-linked structure), which may prevent or reduce melting of the microlattice structure, and subsequent dripping, when the microlattice structure is exposed to a flame.

Additionally, or alternatively, the flame retardant material may be on the struts of the microlattice structure (e.g., as a coating). The coating may be formed on the precursor-micro-lattice structure followed by curing of the precursor-microlattice structure, and/or the coating may be formed on the cured microlattice structure. The coating may be formed by any suitable process, such as dip coating, painting, spraying, melting, sintering, peening, electroplating a metallic coating including flame retardant fillers, and/or charging a coating and using electrostatics to attract the coating to the microlattice structure or precursor-microlattice structure.

The flame retardant material may provide flame retardancy in any suitable manner. For example, the flame retardant portion may limit the fuel supply (e.g., oxygen and/or other readily combustible material such as organic material) for a flame by releasing water or other inert substances, increase char formation to create a noncombustible layer (e.g., a protective layer), and/or reduce temperature through an endothermic reaction. In some embodiments, the flame retardant material includes an organophosphorus and/or nitrogen based compound, but the flame retardant material is not limited thereto. Non-limiting examples of organophosphorus and nitrogen based compounds include melamine, cyanurate, phosphate esters, and phosphonic acids.

The microlattice structure may be formed using any suitable equipment and processes available in the art. For example, the microlattice structure may be formed using equipment and processes described in U.S. Pat. No. 7,382,959, titled "Optically Oriented Three-Dimensional Polymer Microstructures," the entire content of which is incorporated herein by reference.

FIG. 1 is a schematic cross-sectional diagram illustrating a system 100 for forming a microlattice structure according to an embodiment of the present disclosure. As shown in FIG. 1, the microlattice structure 110 may be formed using a single collimated beam (e.g., a beam of ultraviolet (UV) light) or a plurality of independently collimated beams through a patterning apparatus 104 (e.g., a mask) located at a side of a reservoir 102 (e.g., a molding chamber) having (or containing) a composition 108 including components (e.g., a photopolymerizable compound and, optionally, a flame retardant material) that initiate a polymerization (or copolymerization) process upon contact with the beam or beams emitted from a light source 120. The patterning apparatus 104 may include a plurality of apertures 106 (e.g., gaps or openings). Each of the apertures 106 may have a given (or set) shape and dimension defining (e.g., substantially matching) a cross-sectional geometry of a strut 112 (e.g., a self-propagating optical polymer waveguide) of the microlattice structure 110. The microlattice structure 110 may have a three-dimensional (3D) structure defined by the struts 112.

In an embodiment, the mask 104 may be on a transparent substrate (or transparent plate) that forms a side (e.g., a bottom side) of the reservoir 102. In another embodiment, the mask 104 may include the transparent substrate. For example, portions of the transparent substrate may be made to be opaque (or substantially opaque) while other portions of the transparent substrate may remain transparent (or substantially transparent) to allow the beam or beams to be transmitted through the other portions of the transparent substrate.

Figure 2:
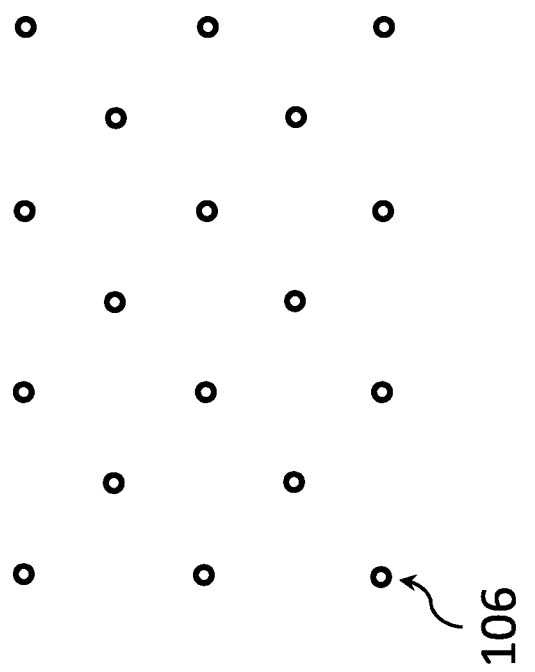
FIGS. 2 and 3 are schematic top views of embodiments of aperture patterns for forming microlattice structures.
Figure 3:
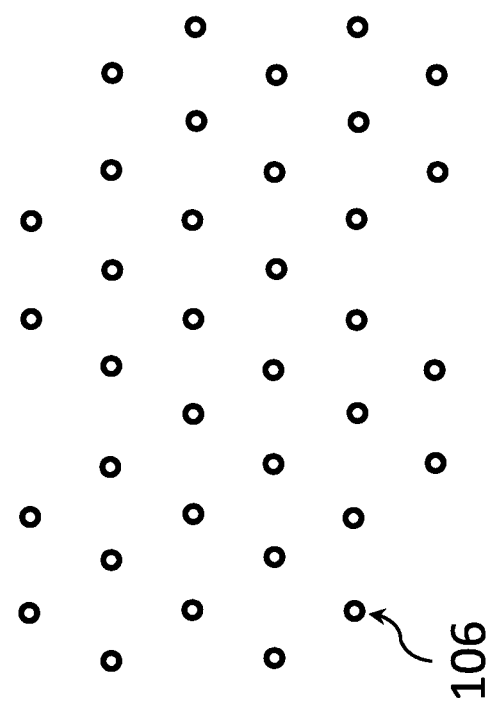

The apertures 106 may be arranged in a pattern, such as a rectangular pattern (or square pattern) as shown in FIG. 2 and/or in a hexagonal pattern as shown in FIG. 3. A distance between apertures 106 in the mask 104, and the number of struts 112 formed from the apertures 106 will determine the open volume fraction (e.g., open space) of the microlattice structure. By controlling the arrangement of the apertures 106, as well as the other features of the system of FIG. 1, the microlattice structure may be designed for a given application. Some of the design parameters for forming the microlattice structure include: 1) the angle and pattern of the struts with respect to one another, 2) the relative density of the resulting cellular structure (or the open volume fraction), and 3) the cross-sectional shape and dimensions of the struts.

As can be seen in FIG. 1, a thickness (or height) of the microlattice structure 110 may be controlled by filling the reservoir 102 with the composition 108 to a set height. Once the beam or beams are applied, the struts 112 (e.g., intersecting struts) grow from a surface of the mask 104 (or a surface of the transparent substrate) and culminate or terminate at a free (e.g., upper) surface of the composition 108 in the reservoir 102 to form the struts 112 (e.g., grown waveguides) of the microlattice structure 110. In some embodiments, the struts 112 (e.g., the intersecting polymer waveguides) polymerize or copolymerize to form the precursor-microlattice structure or microlattice structure. The struts 112 may independently have a diameter (e.g., thickness) of about 10 μm to about 10 mm, and may intersect at nodes that may be distanced apart from one another by a distance of about 2 to about 20 times the node diameter.

According to an embodiment, a precursor-microlattice structure may be formed and/or shaped using the beam or beams, and then further cured (e.g., post-cured or surface cured) by any suitable curing means available in the art, for example, photocuring, thermal curing, and/or moisture curing. The beam or beams may initiate a reaction (e.g., the first or second reactions) by way of a photoinitiator. Any suitable photoinitiator available in the art may be utilized. For example, the microlattice structure or precursor-microlattice structure may be formed using a plurality of photoinitiators and/or a plurality of light sources, for example, as described in U.S. Pat. No. 9,096,722, issued on Aug. 4, 2015, and titled "Method For Curing Structures Using A Dual Photoinitiator System and Structure Made Using The Same," the entire contents of which are incorporated by reference herein. The cured microlattice structure or precursor-micro-lattice structure may have a 3D ordered open-cellular microstructure.

Figure 4:
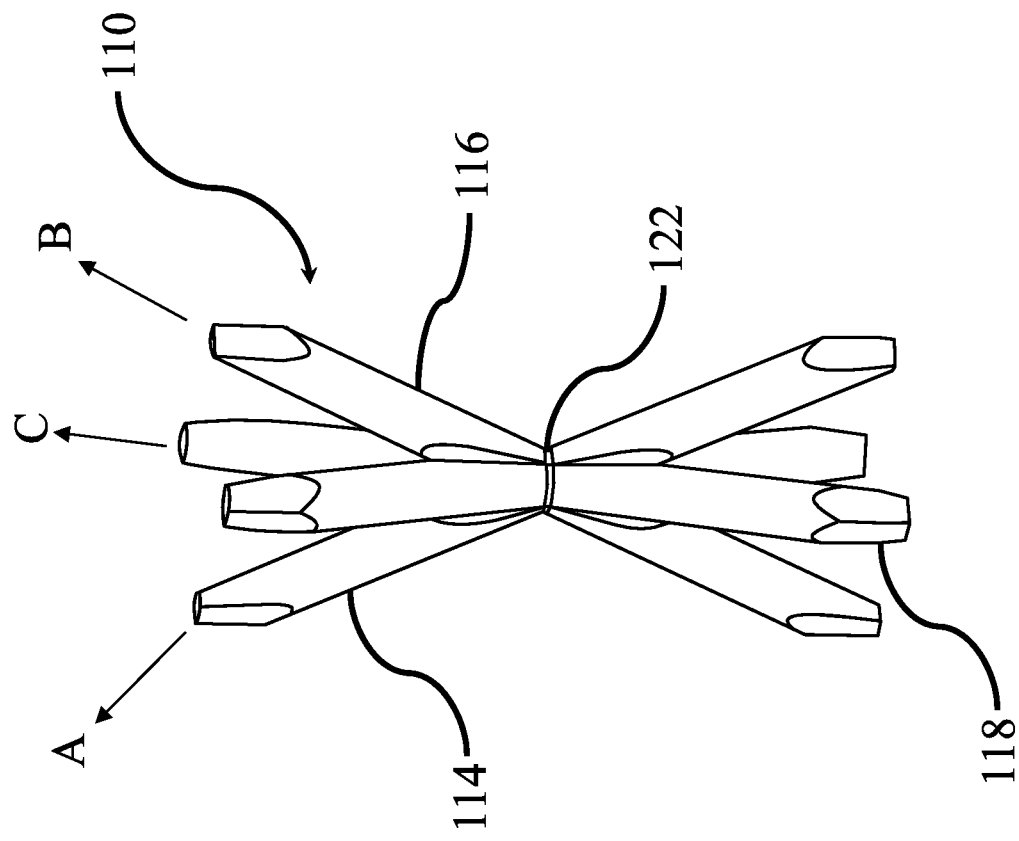
FIGS. 4 and 5 are schematic perspective views of respective portions of embodiments of microlattice structures.
Figure 5:
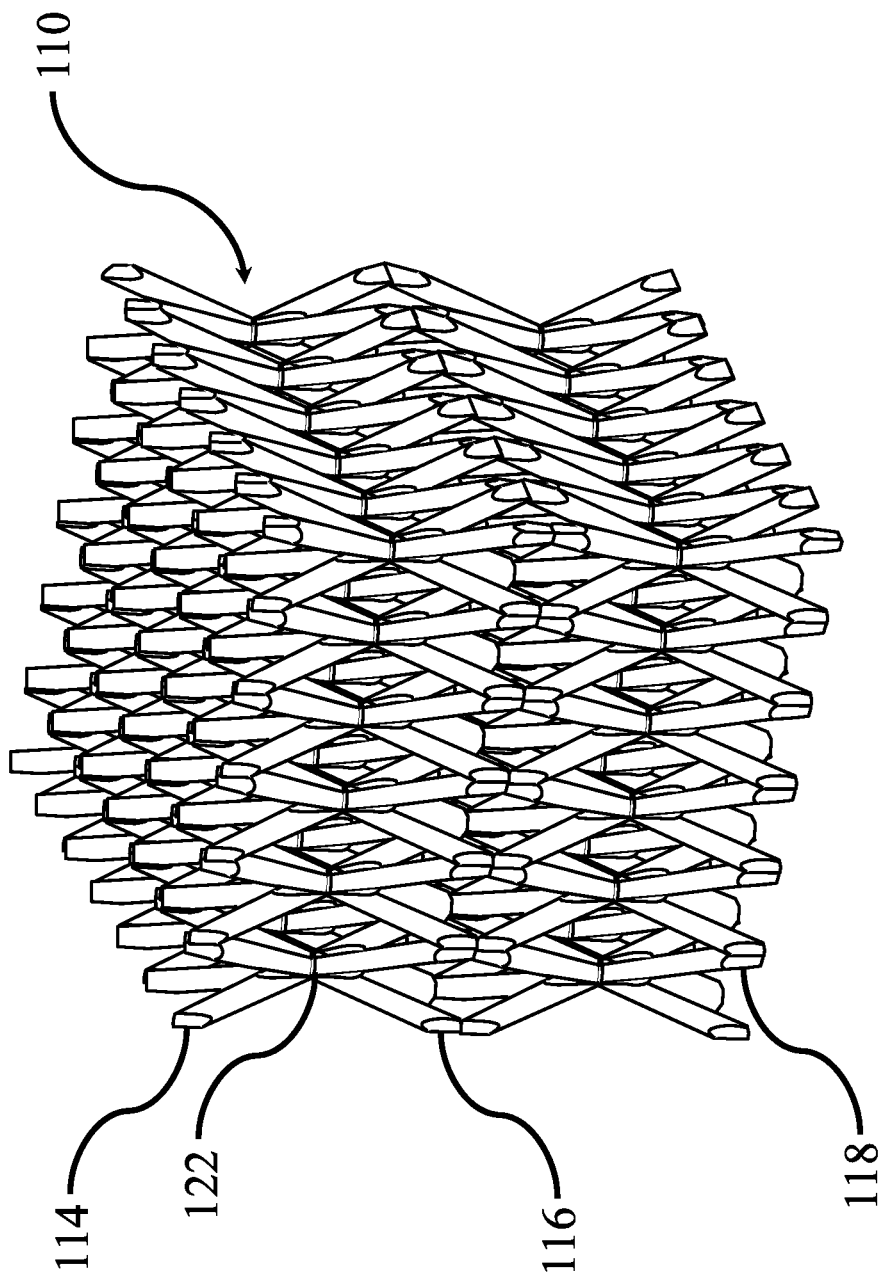

For example, in the embodiments shown in FIGS. 4 and 5, the struts of the micro-lattice structure 110 include first truss elements 114, second truss elements 116, and third truss elements 118. The first truss elements 114 are defined by first self-propagating polymer waveguides and extend along a first direction A. The second truss elements 116 are defined by second self-propagating polymer waveguides and extend along a second direction B. The third truss elements 118 are defined by third self-propagating polymer waveguides and extend along a third direction C. The truss elements 114, 116, and 118 interpenetrate each other at nodes 122 to form a continuous material having a three-dimensional microstructure order and having a plurality of three-dimensional ordered pores (or spaces) defined by (or between) the truss elements 114, 116, 118 and the nodes 122. In some embodiments, the continuous material is continuously formed such that it lacks any interior boundaries, e.g., boundaries within the interpenetrating portions of truss elements 114, 116, and 118. In some embodiments, each node 122 of the microlattice structure 110 is formed of the continuous material. As should be recognized by a person of ordinary skill in the art to which this disclosure pertains, alterations and changes in the described microlattice structure and precursor-microlattice structure and the method of forming the same can be practiced without meaningfully departing from the principles, spirit, and scope of this disclosure, as described herein.

For example, embodiments of the microlattice structure are not limited to a single UV curing reaction, as that may limit the end group chemistry of monomers utilized to form the microlattice structure and may preclude many chemistries that may improve the structural and chemical properties of the microlattice structure. As such, the microlattice structure is not limited to any particular end group chemistry of the monomers utilized to form the microlattice structure. For example, the microlattice structure may be formed utilizing a wide variety of chemical precursors, thereby increasing the range of properties that the final microlattice structure may possess and decreasing the cost of the chemical precursors by allowing for the utilization of monomers used in other structural polymer fields. Some of those polymers, such as urethanes and epoxies, have been developed more than acrylates and thiol-enes leading to the development of more cost effective monomers having improved structural capabilities, ambient condition reactivity, and chemical functionality such as flame retardance, chemical resistance, etc. By utilizing orthogonal reactive functionality to form the microlattice structure, a far greater range of final microlattice chemistries and, therefore, properties may be accessed. One of the benefits provided by aspects of embodiments of the copolymer method of the present disclosure is that we may now architect and form 3D cellular structures using chemistries that otherwise cannot be directed (e.g., chemistries that are otherwise agnostic towards the direction of reaction). According to embodiments of the present disclosure, flame retardant materials (e.g., fire retardant materials) may now be incorporated into the microlattice structure through non-UV polymerizable chemistries.

Figure 6:
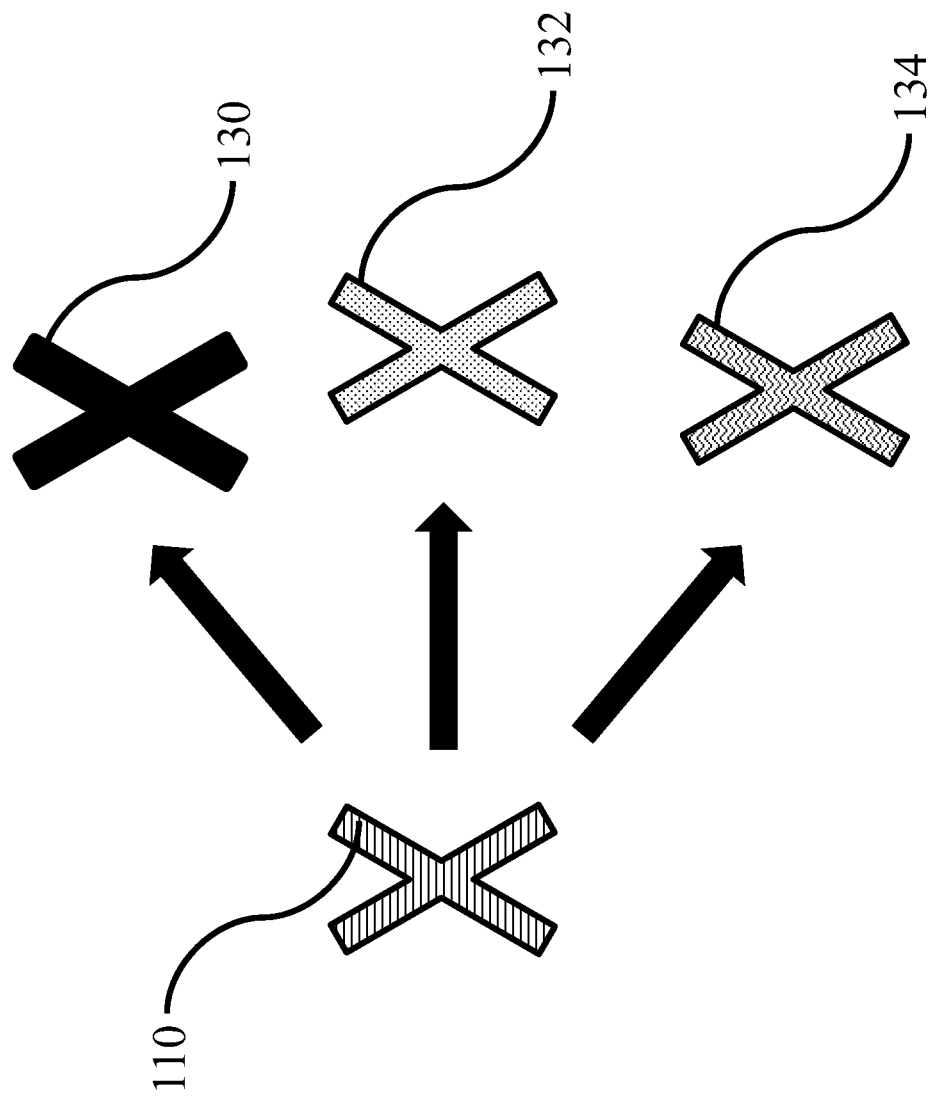
FIG. 6 is a schematic diagram illustrating embodiments of microlattice structures.

FIG. 6 is a schematic diagram illustrating certain ways in which the form factor of the microlattice structure 110 can be utilized as a microlattice structure including the flame retardant material. For example, in FIG. 6, a microlattice structure 130 includes a coating including a flame retardant material, a microlattice structure 132 includes a flame retardant material (e.g., a filler, such as particles or a polymer of flame retardant material) embedded or physically entrained or trapped in struts, and a microlattice structure 134 includes a copolymer including a flame retardant material.

Figure 7:
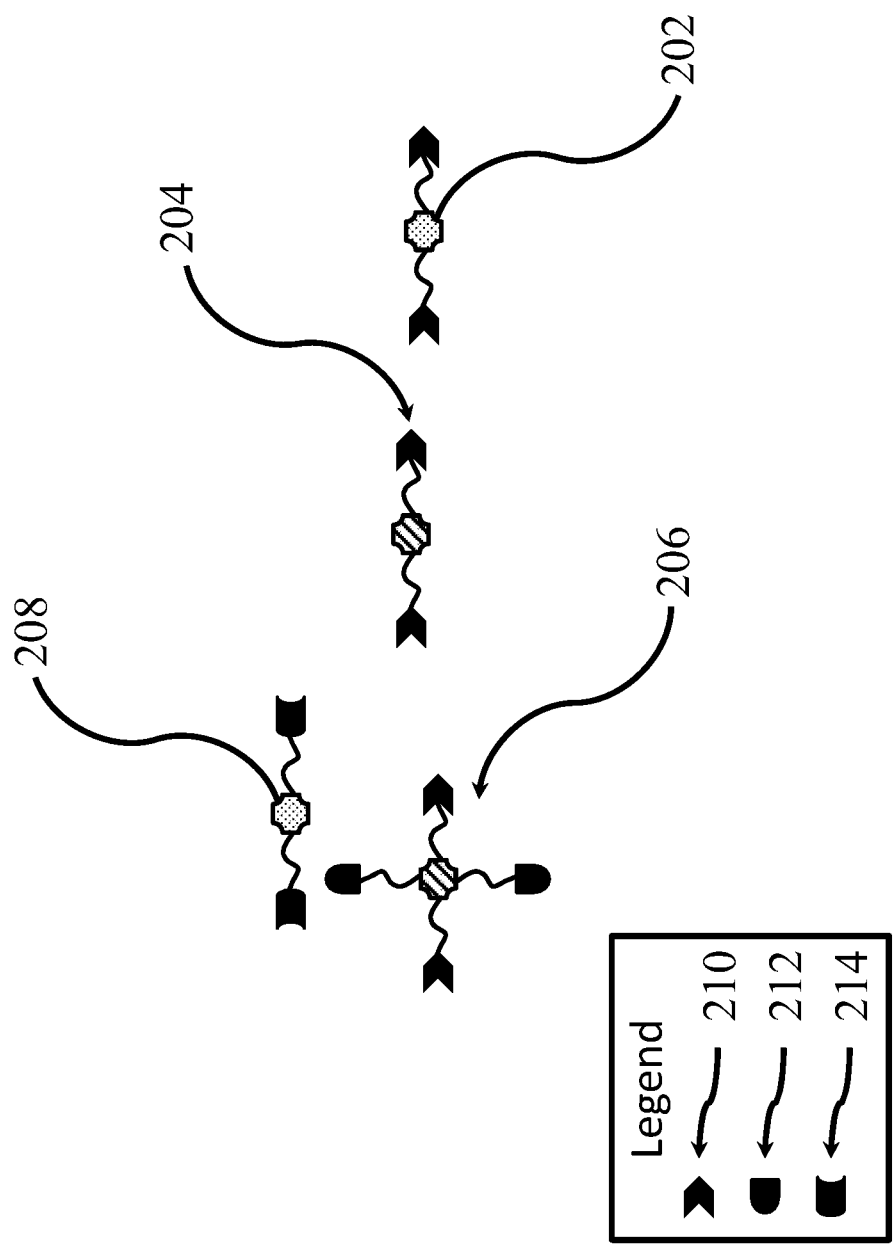
FIG. 7 is a schematic diagram illustrating embodiments of compounds for forming microlattice structures.

FIG. 7 is a schematic diagram showing non-limiting schematic representations of compounds that may be used to form the precursor-microlattice structure or the micro-lattice structure according to embodiments of the present disclosure. For example, as shown in FIG. 7 a flame retardant material 202, a photopolymerizable compound 204, a photopolymerizable compound 206, and/or a flame retardant material 208 may be combined (e.g., polymerized, copolymerized, and/or cross-linked) to form the precursor-microlattice structure or the micro-lattice structure. The compounds illustrated in FIG. 7 can be combined in a variety of suitable ways to form the precursor-microlattice structure or the microlattice structure. The flame retardant material 202, the photopolymerizable compound 204, the photopolymerizable compound 206, and the flame retardant material 208 may each independently be a monomer, comonomer, oligomer, prepolymer, polymer, copolymer or a mixture thereof.

The flame retardant material 202 may include a phosphate, a phosphonate, and/or a phosphinate, and a suitable reactive group or groups may be bonded to the phosphate, the phosphonate, and/or the phosphinate. For example, the flame retardant material 202 may include the phosphate (e.g., an organic phosphate):

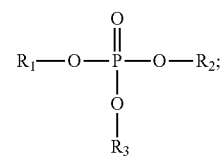

the phosphonate (e.g., an organic phosphonate):

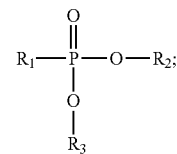

and/or the phosphinate (e.g., an organic phosphinate):

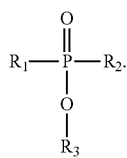

In the foregoing chemical formulae, $R_1$, $R_2$, and $R_3$ may each independently be any suitable functional group capable of reacting during the first or second reactions described herein.

For example, as can be seen in FIG. 7, a photopolymerizable functional group 210 may be bonded to the flame retardant material 202. A non-limiting, commercially available example of the flame retardant material 202 includes bis[2-(methacryloyloxy)ethyl] phosphate. The photopolymerizable compound 204 and the photopolymerizable compound 206 may also each include the photopolymerizable functional group 210. The photopolymerizable functional group 210 may react during the first reaction. For example, the photopolymerizable functional group 210 of the flame retardant material 202, the photopolymerizable compound 204, and the photopolymerizable compound 206 may each independently be a functional group that reacts during a photopolymerization reaction (e.g., a photopolymerization reaction, such as a UV-initiated, free radical or ionic reaction) to form a polymer or copolymer. The photopolymerizable functional group may be any suitable functional group that is susceptible to a UV initiator (e.g., free radical UV initiators, cationic UV initiators, and the like). Non-limiting examples of the photopolymerizable functional group 210 include thiols, alkenes, alkynes, acrylates, epoxies, and/or methacrylates. The photopolymerizable compound 204 and the photopolymerizable compound 206 may include any suitable backbone available in the art.

In certain embodiments, the photopolymerizable compound 204 and/or photopolymerizable compound 206 include a first compound including an unsaturated carbon-carbon bond and a second compound including a terminal thiol group. The unsaturated carbon-carbon bond of the first compound may include a carbon-carbon double bond and/or a carbon-carbon triple bond. For example, the first compound including the unsaturated carbon-carbon bond may include ethylene, substituted olefins, 1,3-dienes, styrene, α-methyl styrene, vinyl esters, acrylates, methacrylates, acrylonitriles, acrylamides, N-vinyl carbazoles, N-vinyl pyrrolidone, and mixtures thereof. The second compound including the terminal thiol group may include pentaerythritol-tetra-3-mercaptopropionate, trimethylolpropane tris(3-mercaptopropionate), 1,6-hexanedithiol, trimethylolpropane tris(2-mercaptoacetate), ethoxylated trimethylolpropane tris (3-mercaptopropionate), glycol di-3-mercaptopropionate, and mixtures thereof. The first compound including the unsaturated carbon-carbon bond may be included in a composition for forming the microlattice structure in an amount of 10 to 99 wt %. The second compound including the terminal thiol group may be included in the composition in an amount of 10 to 99 wt %, based on the total weight of the composition.

In addition to the reactive functional group 210, the photopolymerizable compound 206 may also include a reactive functional group 212 (e.g., a first non-photopolymerizable functional group). A reactive functional group 214 (e.g., a second non-photopolymerizable functional group) may be bonded to the flame retardant material. The reactive functional group 212 and the reactive functional group 214 may be non-reactive during the first reaction (e.g., a photopolymerization reaction, such as a UV-initiated, free radical or ionic reaction), but the reactive functional group 212 may react with the reactive functional group 214 during the second reaction (e.g., a photopolymerization reaction at a different wavelength, a thermal curing reaction, or a moisture curing reaction). Non-limiting examples of the reactive functional group 212 (e.g., the first non-photopolymerizable functional group) include an isocyanate group, a hydroxyl group, an amine group, a carboxylic acid group, an epoxy group, and/or a silyl ether (a silyl ether group). Non-limiting examples of the reactive functional group 214 (e.g., the second non-photopolymerizable functional group) include an isocyanate group, a hydroxyl group, an amine group, a carboxylic acid group, and/or an epoxy group. For example, the hydroxyl group of the reactive functional group 212 and/or the reactive functional group 214 may be included in any suitable alcohol available in the art.

Figure 8:
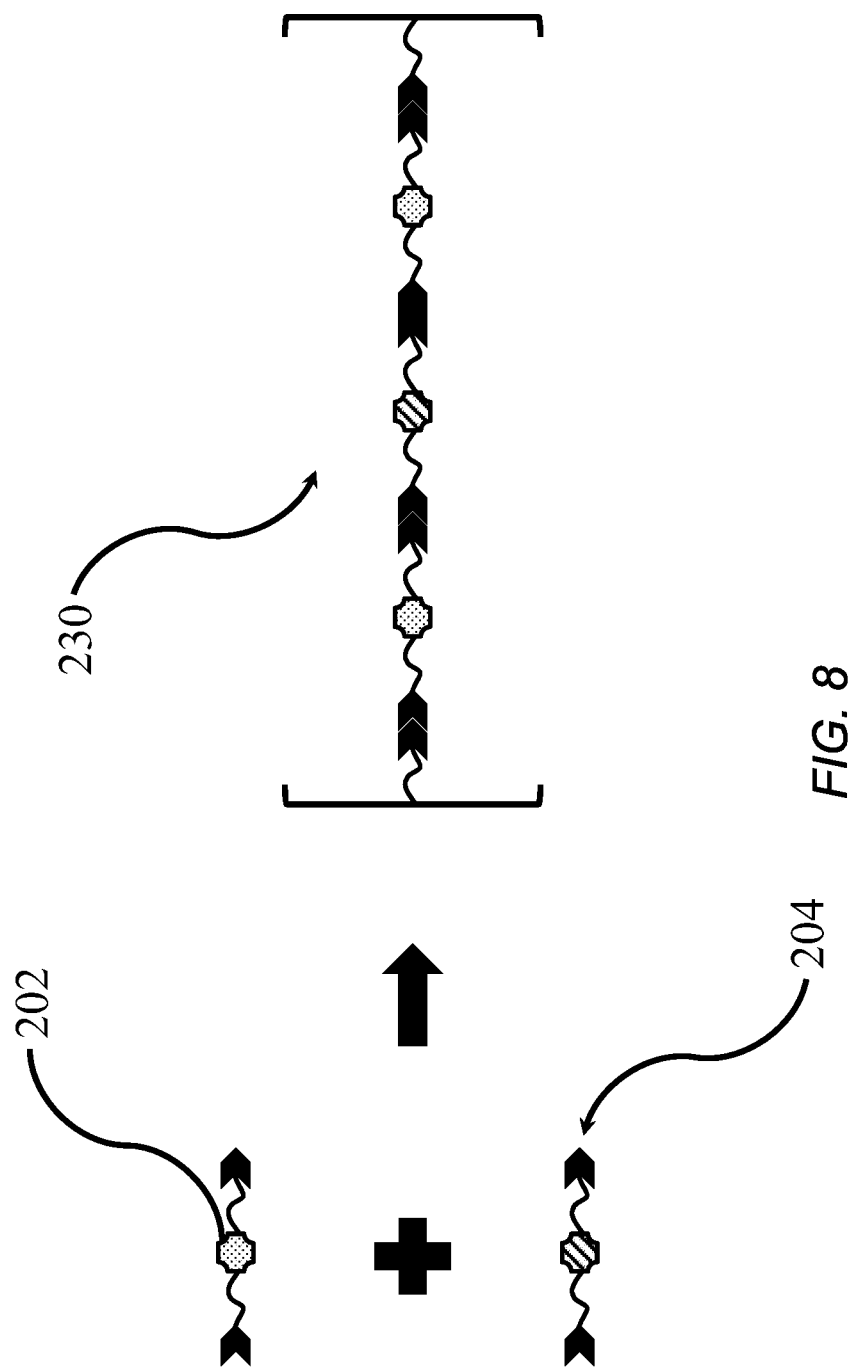
FIGS. 8-16 are schematic diagrams illustrating embodiments of reactions for forming microlattice structures.

FIGS. 8-16 are schematic diagrams illustrating reactions of the flame retardant material 202, the photopolymerizable compound 204, the photopolymerizable compound 206, and/or the flame retardant material 208 that may be utilized to form the microlattice structure and/or precursor-microlattice structure according to embodiments of the present disclosure. For example, as shown in FIG. 8, the flame retardant material 202 and the photopolymerizable compound 204 may be reacted (e.g., copolymerized) in the first reaction (e.g., a photopolymerization reaction, such as a UV-initiated, free radical or ionic reaction) to form a copolymer 230. The copolymer 230 may be included in, or may define, the struts of the microlattice structure. In FIGS. 8-16, the brackets indicate repeating structures, but the polymers and copolymers shown in FIGS. 8-16 are not limited to the patterns shown as the polymers and copolymers may include any suitable arrangement of components, such as those found in alternating copolymers, periodic copolymers, statistical copolymers, block copolymers, and/or graft copolymers.

Figure 9:
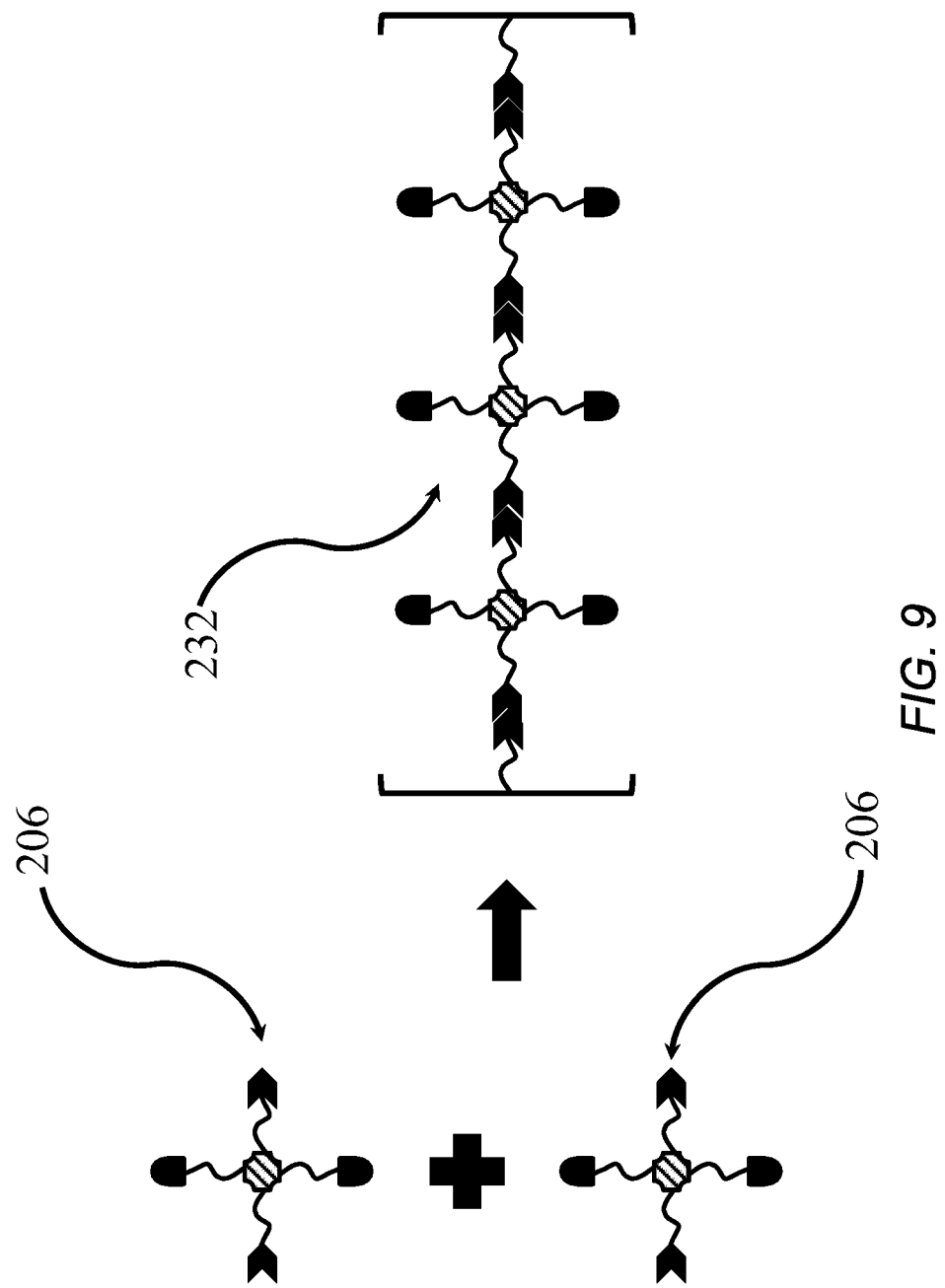
Figure 10:
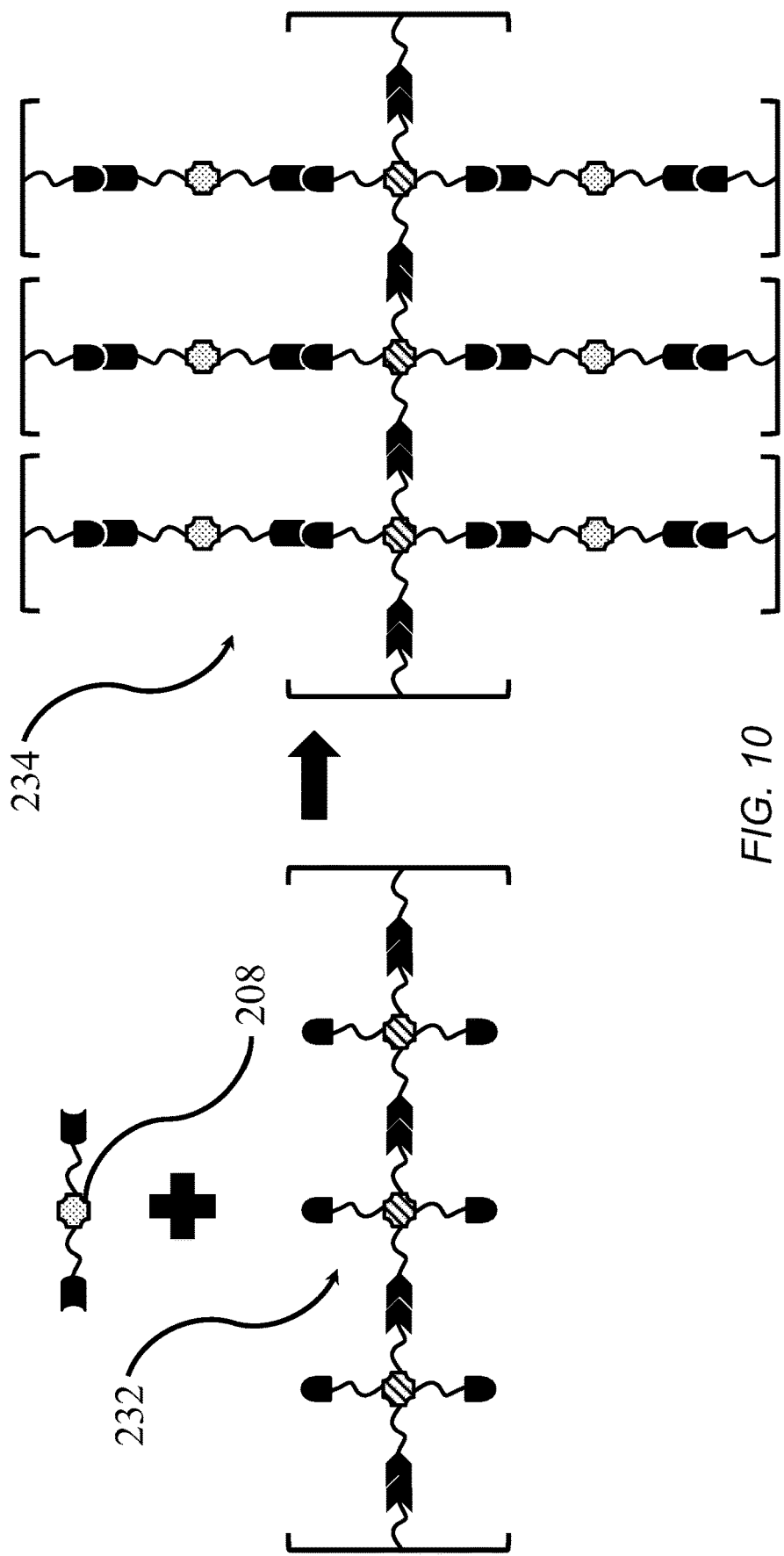

As shown in FIG. 9, the photopolymerizable compound 206 may be reacted (e.g., polymerized in the first reaction (e.g., a photopolymerization reaction, such as a UV-initiated, free radical or ionic reaction) to form a polymer 232. The polymer 232 may be included in, or may define, the struts of the precursor microlattice structure. As shown in FIG. 10, the polymer 232 may be reacted (e.g., copolymerized, cross-linked, or cured) with the flame retardant material 208 through the second reaction (e.g., a photopolymerization reaction at a different wavelength, a thermal curing reaction, or a moisture curing reaction) to form a copolymer 234. The copolymer 234 may be included in, or may define, the struts of the microlattice structure.

Figure 11:
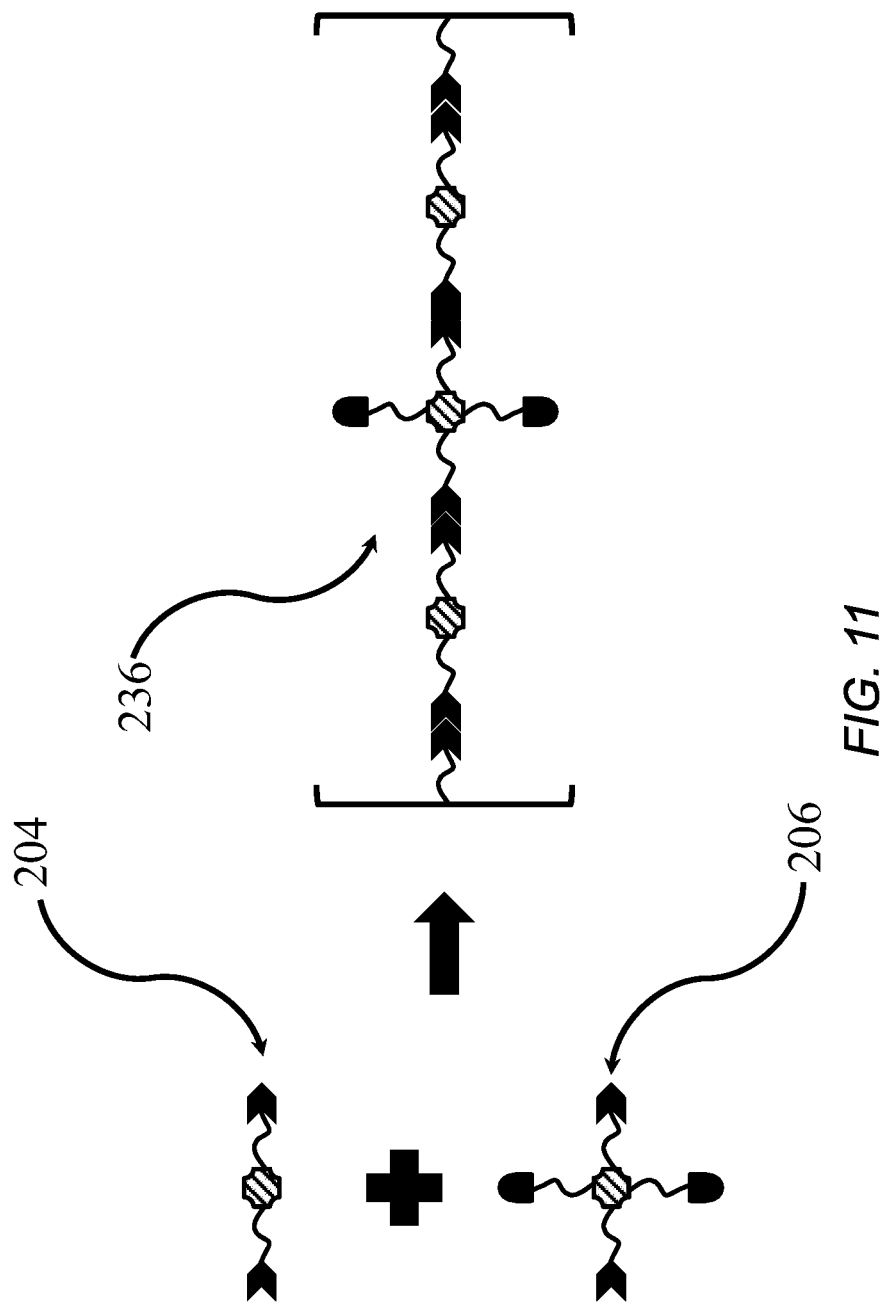
Figure 12:
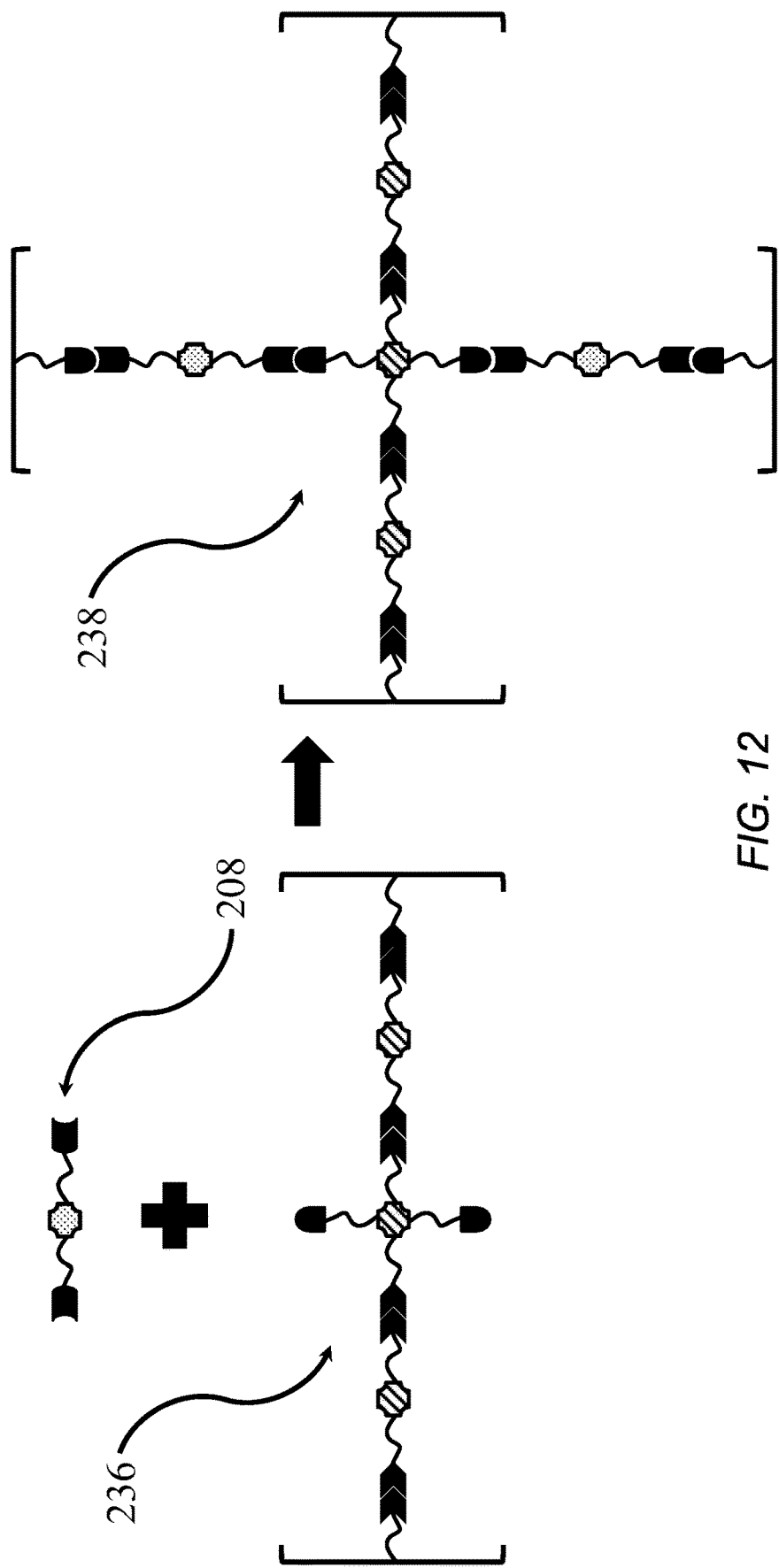

As shown in FIG. 11, the photopolymerizable compound 204 and the photopolymerizable compound 206 may be reacted (e.g., copolymerized) in the first reaction (e.g., a photopolymerization reaction, such as a UV-initiated, free radical or ionic reaction) to form a copolymer 236. The copolymer 236 may be included in, or may define, the struts of the precursor microlattice structure. As shown in FIG. 12, the copolymer 236 may be reacted (e.g., copolymerized, cross-linked, or cured) with the flame retardant material 208 through the second reaction (e.g., a photopolymerization reaction at a different wavelength, a thermal curing reaction, or a moisture curing reaction) to form a copolymer 238. The copolymer 238 may be included in, or may define, the struts of the microlattice structure.

Figure 13:
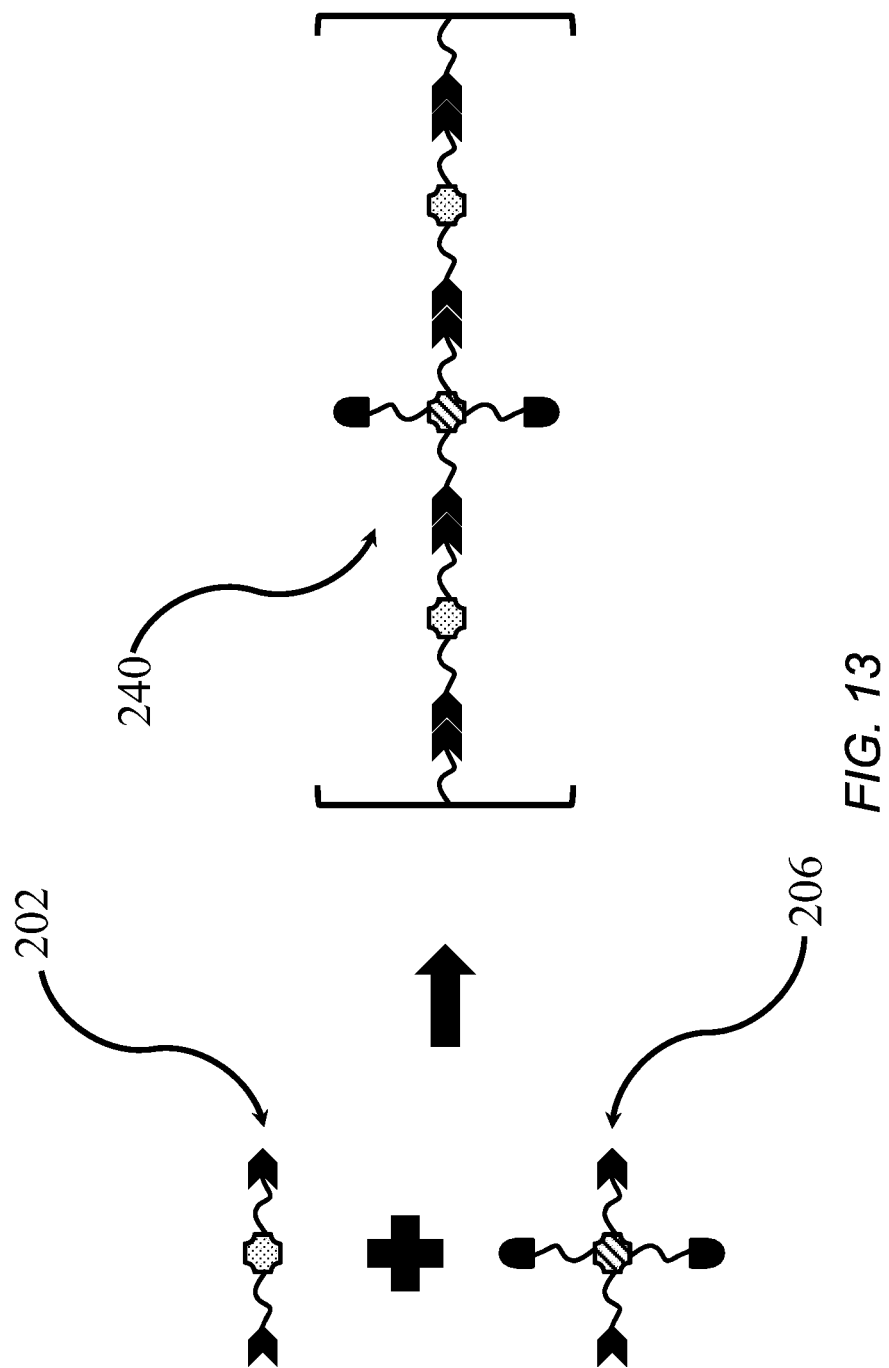
Figure 14:
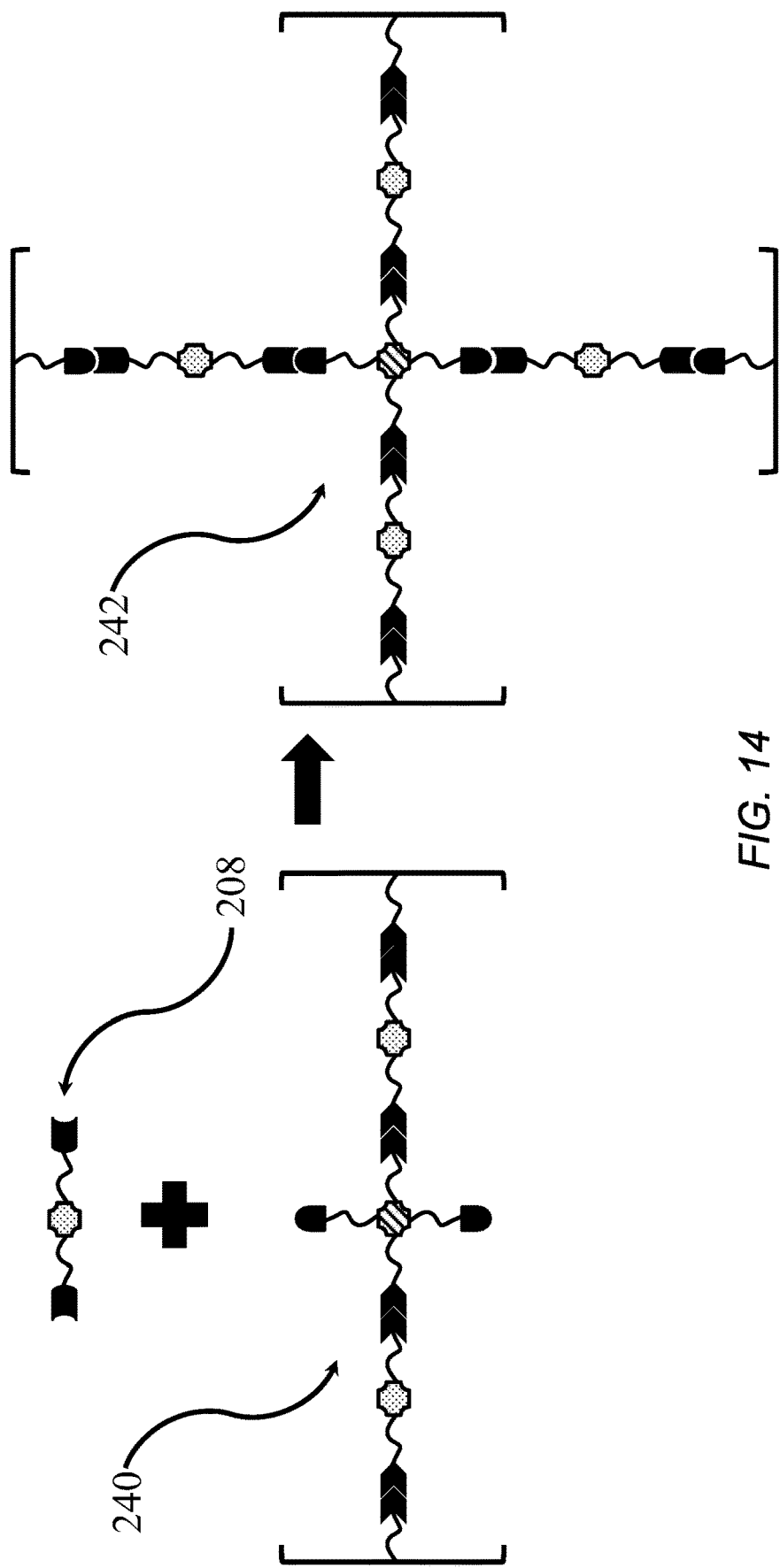

As shown in FIG. 13, the flame retardant material 202 and the photopolymerizable compound 206 may be reacted (e.g., copolymerized) in the first reaction (e.g., a photopolymerization reaction, such as a UV-initiated, free radical or ionic reaction) to form a copolymer 240. The copolymer 240 may be included in, or may define, the struts of the precursor-micro-lattice structure. As shown in FIG. 14, the copolymer 240 may be reacted (e.g., copolymerized, cross-linked, or cured) with the flame retardant material 208 through the second reaction (e.g., a photopolymerization reaction at a different wavelength, a thermal curing reaction, or a moisture curing reaction) to form a copolymer 242. The copolymer 242 may be included in, or may define, the struts of the microlattice structure.

Figure 15:
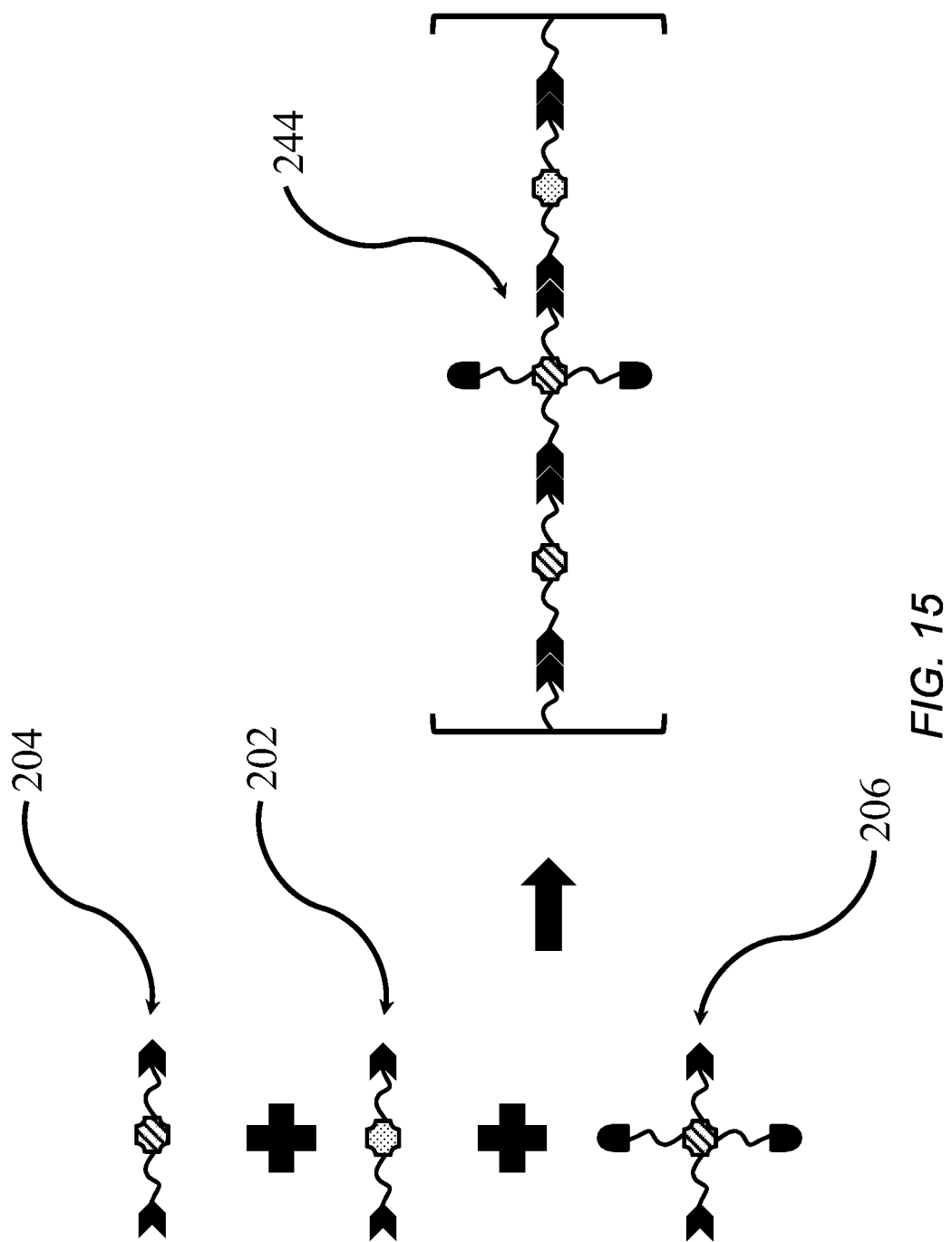
Figure 16:
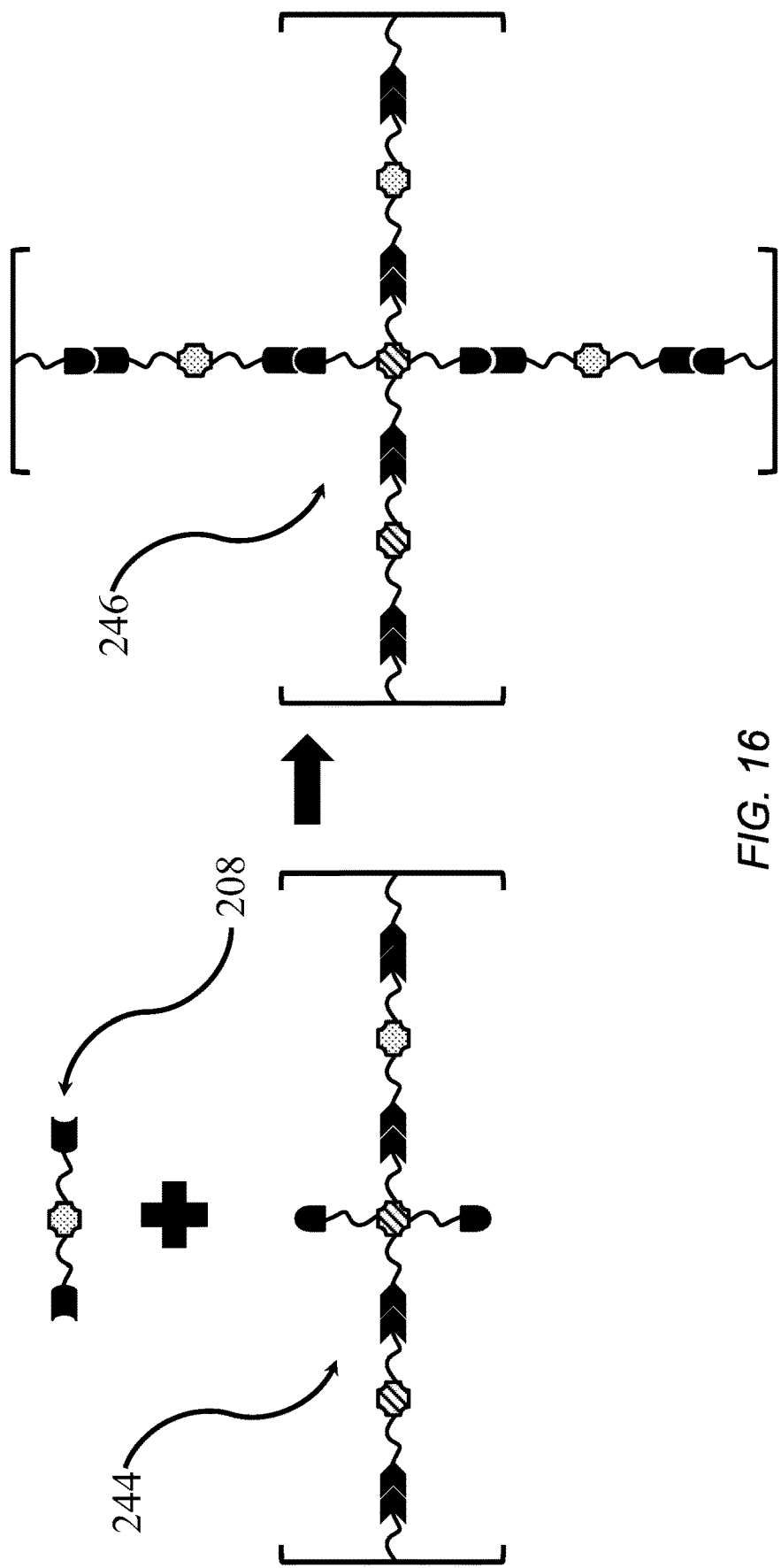

As shown in FIG. 15, the flame retardant material 202, the photopolymerizable compound 204, and the photopolymerizable compound 206 may be reacted (e.g., copolymerized) in the first reaction (e.g., a photopolymerization reaction, such as a UV-initiated, free radical or ionic reaction) to form a copolymer 244. The copolymer 244 may be included in, or may define, the struts of the precursor-microlattice structure. As shown in FIG. 15, the copolymer 244 may be reacted (e.g., copolymerized, cross-linked, or cured) with the flame retardant material 208 through the second reaction (e.g., a photopolymerization reaction at a different wavelength, a thermal curing reaction, or a moisture curing reaction) to form a copolymer 246. The copolymer 246 may be included in, or may define, the struts of the microlattice structure.

Additionally, or alternatively, the microlattice structure may include a flame retardant material that is not chemically bonded to a polymer that defines the struts of the microlattice structure. For example, the struts of the microlattice structure may include, or be defined by, a polymer formed from any of the above-described photopolymerizable compounds (e.g., the polymer may include a reaction product of any of the above-described photopolymerizable compounds), and the polymer may at least partially surround the flame retardant material. For example, the flame retardant material may be embedded or physically entrained or trapped in the polymer. The flame retardant material may include a polymer (e.g., a secondary polymeric phase) that is different from the polymer that defines the struts, and/or the flame retardant material may include particles (e.g., fillers).

For example, flame retardant solids in particle form may be introduced into a composition including any of the photopolymerizable compounds described herein in order to reduce flammability and/or reduce the evolution of toxic smoke during combustion of the microlattice structure. Particles such as, but not limited to, alumina trihydrate, ammonium polyphosphate, red phosphorous, organic phosphinate, melamine polyphosphate, borates, and expandable graphite may be introduced and dispersed in the composition to achieve suitable or desired combustion behavior.

The particles may be opaque and/or scatter light. Thus, if the particles are included in the composition at too high of a concentration, the particles will excessively scatter or reflect the UV light and thereby impede or reduce the formation of the microlattice structure. Suitable concentrations of the particles will be affected by the height (or depth) of the microlattice structure being formed as the height of the microlattice structure affects the depth to which the UV light should penetrate. The concentration of the particles in the composition may be 1 to 33 wt %, for example, 4 to 10 wt %, based on the total weight of the composition. In one embodiment, particles including ammonium were dispersed in a composition including a photomonomer resin, and concentrations of the particles as high as 4 wt %, based on the total weight of the composition, were achievable without significant or substantial degradation of the ability to form a 12.7 mm thick microlattice structure.

The particles may be added to the composition in any suitable manner available in the art. For example, the particles may be introduced in a dry powder form, in a suspension of photomonomer (e.g., a suspension of the photopolymerizable compound), or in a solvent that is later evaporated. Non-limiting examples of the solvent include acetone, toluene, isopropanol, and mixtures thereof. The particles may be dispersed in the composition via mechanical mixing. The particles may also be surface treated to promote adhesion with the resin (e.g., the polymer, or to prevent or reduce agglomeration of particles in the composition (or suspension).

The secondary polymeric phase that is not bonded to or crosslinked with the photomonomer resin (e.g., the photopolymerizable compound or polymer or copolymer formed from the photopolymerizable compound) may also be included in the microlattice structure as an additive or filler. The secondary polymeric phase may be transparent to UV light, and therefore, the secondary polymeric phase may be included in the composition at a concentration higher than that of the particles. Including the secondary polymeric phase in the composition may result in a refractive index mismatch, which may limit or reduce the depth to which UV light may penetrate the composition. Thus, suitable concentrations of the secondary polymeric phase will be affected by the height (or depth) of the microlattice structure being formed as the height of the micro-lattice structure affects the depth to which the UV light should penetrate. For example, the secondary polymeric phase may be included in the composition in an amount of 1 to 33 wt % based on the total weight of the composition.

In one embodiment, a secondary polymeric phase including a phosphorous based oligomer was dissolved in a solvent and introduced into the photomonomer resin (the composition) to impart flame retardancy. Alternatively, or additionally, such an oligomer may be introduced suspended in an uncured liquid polymer/oligomer carrier which may be cured in place after UV curing of the photomonomer (the photopolymerizable compound), the liquid polymer/oligomer and flame retardant oligomer thus forming a secondary flame retardant phase in the final micro-lattice structure. The secondary polymeric phase may be introduced and dispersed in the same manner as described for flame retardant particles.

Figure 17:
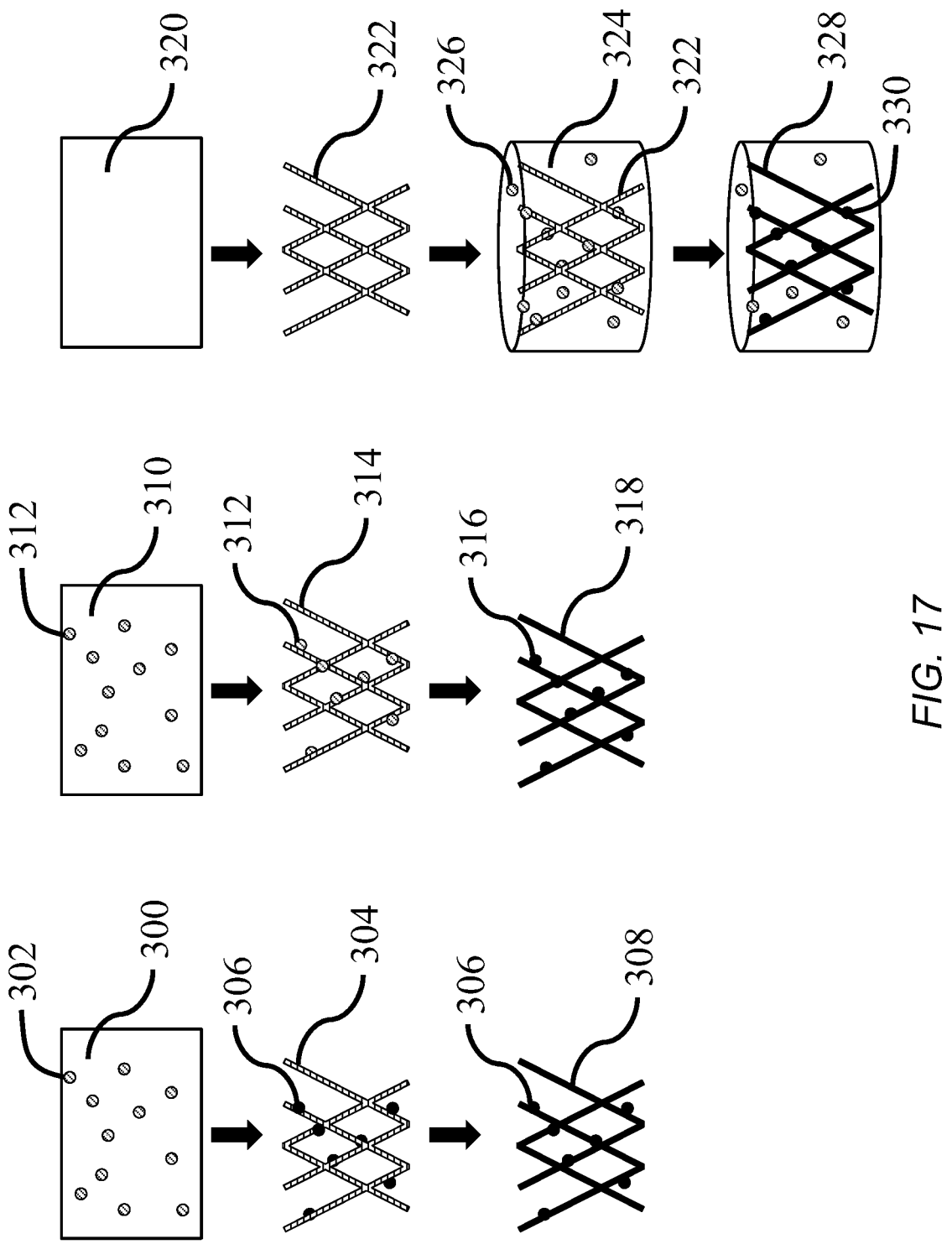

FIG. 17 is a schematic diagram illustrating embodiments of methods of forming a microlattice structure. As shown in FIG. 17, according to one embodiment, a composition 300 includes an unreacted flame retardant material 302. The flame retardant material 302 may include any of the flame retardant materials described herein (e.g., the flame retardant materials 202 and/or 208, flame retardant particles, and/or the flame retardant polymer). The composition 300 may further include any of the photopolymerizable compounds described herein (e.g., the photopolymerizable compounds 204 and/or 206). The composition 300 may further include any suitable components available in the art, such as photoinitiators, stabilizers, inhibitors, and the like. Further, according to any of the embodiments disclosed herein, an inhibitor and/or an initiator may include a flame retardant material. By adding phosphorus groups to the inhibitor and/or initiator an amount of the flame retardant material in the microlattice structure may be increased with relatively lower reduction in the thermal and/or mechanical properties of the microlattice structure since a majority of the backbone forming monomers may be added to the composition. The composition 300 is utilized to form a precursor-microlattice structure 304 via the first reaction (e.g., UV-initiated photopolymerization).

In the first reaction, the unreacted flame retardant material 302 reacts with the photopolymerizable compound and/or other unreacted flame retardant material to form struts of the precursor-microlattice structure 304. Thus, the precursor-microlattice structure 304 includes the reacted flame retardant material 302. The precursor-microlattice structure 304 may then be reacted by way of a second reaction (e.g., a photopolymerization reaction at a wavelength different than that of the first reaction, a thermal curing reaction, and/or a moisture curing reaction) to form a microlattice structure 308 including the reacted flame retardant material 306. A polymer of the precursor-microlattice structure 304 may fully crosslink during the second reaction.

As also shown in FIG. 17, a microlattice structure may be formed from a composition 310, for example, by way of a dual cure process (e.g., a gel process). The composition 310 includes an unreacted flame retardant material 312. The unreacted flame retardant material 312 may include any of the flame retardant materials described herein (e.g., the flame retardant materials 202 and/or 208, flame retardant particles, and/or the flame retardant polymer). The composition 310 may further include any of the photopolymerizable compounds described herein (e.g., the photopolymerizable compounds 204 and/or 206). The composition 310 may further include any suitable components available in the art, such as photoinitiators, stabilizers, inhibitors, and the like. The composition 310 is utilized to form a precursor-microlattice structure 314 via the first reaction (e.g., UV-initiated photopolymerization).

The precursor-microlattice structure 314 includes the unreacted flame retardant material 302. The unreacted flame retardant material 312 may be on and/or embedded or physically entrained or trapped in a polymer of struts of the precursor-microlattice structure 314. The precursor-microlattice structure 314 may then be reacted by way of a second reaction (e.g., a photopolymerization reaction at a wavelength different than that of the first reaction, a thermal curing reaction, and/or a moisture curing reaction) to form a microlattice structure 318 including a reacted flame retardant material 316. For example, the unreacted flame retardant material 312 may react (e.g., crosslink) with the polymer of the struts of the precursor-microlattice structure 314 to form struts of the microlattice structure 318 that include the reacted flame retardant material 316. The polymer of the precursor-microlattice structure 314 may fully crosslink during the second reaction.

As also shown in FIG. 17, a microlattice structure may be formed from a composition 320, for example, by way of a soak process. The composition 320 includes at least one of the photopolymerizable compounds described herein (e.g., the photopolymerizable compounds 204 and/or 206), but the composition 320 does not include the flame retardant material. The composition 320 may further include any suitable components available in the art, such as photoinitiators, stabilizers, inhibitors, and the like. The composition 320 is utilized to form a precursor-microlattice structure 322 via the first reaction (e.g., UV-initiated photopolymerization).

An unreacted flame retardant material 326 may then be added to the composition 320, and/or the precursor-microlattice structure 322 may be added to a composition 324 including the unreacted flame retardant material 326. The unreacted flame retardant material 326 may include any of the flame retardant materials described herein (e.g., the flame retardant materials 202 and/or 208, flame retardant particles, and/or the flame retardant polymer). The unreacted flame retardant material 326 may be on and/or swelled into a polymer of struts of the precursor-micro-lattice structure 322. The precursor-microlattice structure 322 and unreacted flame retardant material 326 may then be reacted by way of a second reaction (e.g., a photopolymerization reaction at a wavelength different than that of the first reaction, a thermal curing reaction, and/or a moisture curing reaction) to form a microlattice structure 328 including a reacted flame retardant material 330. For example, the unreacted flame retardant material 326 may react (e.g., crosslink) with the polymer of the struts of the precursor-microlattice structure 322 to form struts of the micro-lattice structure 328 that include the reacted flame retardant material 330. The unreacted flame retardant material 326 may be selectively at a surface of the struts of the precursor-microlattice structure 322, or the unreacted flame retardant material 326 may be incorporated substantially throughout the struts of the precursor-microlattice structure 322, and then reacted.

FIG. 18 is a schematic diagram illustrating embodiments of methods of forming a microlattice structure including a coating. For example, as shown in FIG. 18, a composition 400 is reacted (e.g., cured) by the first reaction to form a precursor-microlattice structure 402. The precursor-microlattice structure 402 may then be reacted (e.g., cured) by the second reaction to form a microlattice structure 404. A coating including a flame retardant material is then applied to or formed on the microlattice structure 404 to form a coated microlattice structure 406. In some embodiments, the coating including the flame retardant material is applied to or formed on the precursor-microlattice structure 402, and the coated precursor-microlattice structure is reacted (e.g., cured) by the second reaction to form the coated microlattice structure 406. The coating may be applied by any suitable method available in the art including, but not limited to, dip coating, painting, spraying, melting, sintering, peening, electroplating a metallic coating including flame retardant fillers, and/or charging a coating and utilizing electrostatics to attract two materials. Applying or forming the coating on the precursor-microlattice structure allows available bonding sites of the precursor-microlattice structure to assist with forming chemical bonds between the coating and the precursor-microlattice structure. The microlattice structure or precursor-micro-lattice structure may be roughened before the coating is applied or formed to provide suitable adhesion.

Non-limiting examples of noncombustible materials that may be included in the coating include: metals, ceramics, silicon, silicones, silica, nanoclay, or other nanoparticles or nanofibers. The mechanisms for ceasing, inhibiting or reducing combustion may be substantially the same as described for the other flame retardant materials (e.g., creating a protective char layer, decreasing the temperature, outputting inert gases, and/or simply not providing any combustibles). Optical clarity of the composition is not as much of a consideration for the coating as micro-lattice fabrication process (e.g., UV initiation) is separate. Thus, the coating may utilize solid particles (e.g., inorganic fillers) including, but not limited to, red phosphorus, aluminum trihydroxide (ATH), ammonium polyphosphate (APP). A flowable adhesive as a carrier may be utilized to help with applying and/or forming the coating. The coating provides the flame retardant material at surfaces of the microlattice structure and, thus, the total volume percentage of the flame retardant material may be decreased because the additives are concentrated at the surface and the impact on the mechanical properties of the microlattice structure may be reduced.

According to embodiments of the present disclosure, reactions that are otherwise agnostic towards direction may be architected during the curing process by way of orthogonal chemistry. Examples of such reactions include the isocyanate-alcohol or amine reactions that form polyurethanes and polyureas, respectively. These condensation polymerization reactions would otherwise occur substantially uniformly throughout a reaction vessel, so long as sufficient reactants and catalysts are available. On the other hand, orthogonal chemistry allows for the reaction of orthogonal functional groups independently of each other. Orthogonal functional groups are functional groups that do not engage in similar or identical reactions or that exhibit substantial differences in their respective chemical reactivities (e.g., by way of protecting groups that may subsequently be removed to allow the protecting group to react, for example, as a result of photocuring, thermal curing, and/or moisture curing).

On the other hand, according to embodiments of the present disclosure, the micro-lattice structure may be formed by way of a first reaction and a second reaction, and the polyurethane and/or polyurea may be formed to be included in the struts (e.g., by way of copolymerization) and/or may be grafted onto a surface of the struts to form an ordered structure including polyurethane and/or polyurea. Since the micro-lattice structure may be formed utilizing a UV-initiated, free-radical or ionic reaction, embodiments of the copolymer reaction enable two orthogonal reactions: a first reaction utilizing UV initiation, and a second reaction utilizing another mechanism. Embodiments of this disclosure enable the incorporation of multiple functionalities into a structural microlattice that are incompatible with a UV initiated curing mechanism. Thus, embodiments of flame retardant material may be incorporated through non-UV polymerizable chemistries.

Embodiments of the disclosed subject matter may be utilized in any suitable application as a flame retardant material. For example, embodiments of the microlattice structures may be used as structural polymers where flame retardant properties are beneficial, such as transportation applications, consumer goods, and/or the like, but the present disclosure is not limited thereto. Embodiments of the microlattice structures may be utilized in lightweight structural materials, conformable core structures, acoustic damping, hook and loop attachments; compliant structures; optics for sub-micron waveguide formation; single body casting/ net shape manufacturing; alternate shapes for waveguide members (3D honeycomb); functionally graded structures; heat exchanger/insulator structures; 3D battery/fuel cell structures; thermal switch structures; catalyst support structures; filtration/separation structures; wicking materials/ moisture control structures; directional optical coupler/flexible display structures; distributed lighting structures; electrical interconnects; sensor supports with high surface areas; biological growth templates; flexible body/reactive armors; stealth coatings; high friction/high wear surfaces; waveguides for other energy sources; flame retardant foams; etc.

Examples of transportation applications of the disclosed subject matter include vehicle interiors (e.g., interiors of spacecraft, aircraft, automobiles, subway cars, trains, buses, and the like), battery trays, engine trays, casings near fuel sources, and/or the like, but the present disclosure is not limited thereto. Examples of consumer good applications of the disclosed subject matter include casings for electronic equipment (e.g., casings for batteries or power supplies in appliances or other electronic), furniture, insulation, and/or the like, but the present disclosure is not limited thereto.

The embodiments described herein may each be used singly or in combination to provide an article having a flame retardant property. For example, some of the flame retardant materials may have a high affinity water, which may be detrimental if the flame retardant material absorbs excess moisture from the environment, thereby reducing the flame retardancy of the flame retardant material prior to a flame incident. As such, synergy may be achieved by combining one or more of the embodiments described herein. For example, including flame retardant materials that have a relatively lower affinity for moisture, or utilizing higher cross-linked systems may reduce the effects of environmental moisture on the flame retardancy.

Further, the flame retardant particles (or fillers) may affect the optical properties of the composition for forming the microlattice structure and, thus, in some embodiments, the amount of the flame retardant particles in the composition may be controlled. In some embodiments, the amount of flame retardant material included in the copolymer may be controlled to reduce an effect of the flame retardant material on thermal and/or mechanical properties of the copolymer. Accordingly, in some embodiments, the microlattice structure may include a copolymer including the flame retardant material and the copolymer may at least partially surround flame retardant particles to reduce the effect of the flame retardant particles on the optical properties of the composition and to reduce the effect of the flame retardant material on the thermal and/or mechanical properties of the copolymer, while still providing suitable flame retardancy. Thus, a microlattice structure according to embodiments of the present disclosure may not be limited to a flame retardant additive, copolymer, or coating, but, on the contrary, may include one or more of the flame retardant additive, copolymer, or coating.

As used herein, the terms polymer and copolymer are used broadly and include oligomers and prepolymers. Additionally, polymers and copolymers described herein may be formed from monomers, comonomers, oligomers, and prepolymers. As used herein, expressions of the singular also encompass the plural and vice versa. For example, a description of a micro-lattice structure may also encompass a plurality of microlattice structures and vice versa. Additionally, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Also, in the context of the present application, when a first element is referred to as being "on" a second element, it can be directly on the second element or be indirectly on the second element with one or more intervening elements interposed therebetween. Like reference numerals designate like elements throughout the specification.

Expressions such as "at least one of," when preceding a list of elements, modify the entire list of elements and do not modify the individual elements of the list. Further, the use of "may" when describing embodiments of the present invention refers to "one or more embodiments of the present invention."

As used herein, the terms "use," "using," and "used" may be considered synonymous with the terms "utilize," "utilizing," and "utilized," respectively. As used herein, the term "substantially," "about," and similar terms are used as terms of approximation and not as terms of degree, and are intended to account for the inherent deviations in measured or calculated values that would be recognized by those of ordinary skill in the art. Moreover, the acts described above may be performed in the order described or in any other suitable sequence. Additionally, the methods described above are not limited to the tasks described. Instead, for each embodiment, one or more of the tasks described above may be absent and/or additional tasks may be performed.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An ordered microlattice structure comprising:
a plurality of struts interconnected at a plurality of nodes, the struts comprising:
a copolymer comprising a reaction product of a photopolymerizable compound and a flame retardant material,
wherein the flame retardant material is selected from a phosphate, a phosphonate, a phosphinate, and a mixture thereof.

2. The microlattice structure of claim 1, wherein the photopolymerizable compound comprises a first compound comprising an unsaturated carbon-carbon bond and a second compound comprising a terminal thiol group.

3. The microlattice structure of claim 2, wherein the first compound comprising the unsaturated carbon-carbon bond is selected from the group consisting of ethylene, substituted olefins, 1,3-dienes, styrene, α-methyl styrene, vinyl esters, acrylates, methacrylates, acrylonitriles, acrylamides, N-vinyl carbazoles, N-vinyl pyrrolidone, and mixtures thereof.

4. The microlattice structure of claim 2, wherein the second compound comprising the terminal thiol group is selected from the group consisting of pentaerythritol-tetra-3-mercaptopropionate, trimethylolpropane tris(3-mercaptopropionate), 1,6-hexanedithiol, trimethylolpropane tris(2-mercaptoacetate), ethoxylated trimethylolpropane tris(3-mercaptopropionate), glycol di-3-mercaptopropionate, and mixtures thereof.

5. The microlattice structure of claim 1, wherein a photopolymerizable functional group is bonded to the flame retardant material, and the photopolymerizable functional group of the flame retardant material is selected from a thiol group, an alkenyl group, an alkynyl group, an acrylate group, an epoxy group, and a methacrylate group.

6. An ordered microlattice structure comprising:
a plurality of struts interconnected at a plurality of nodes, the struts comprising:
a polymer comprising a reaction product of a photopolymerizable compound; and
a flame retardant material,
wherein the flame retardant material is attached to the polymer by a chemical bond, and
wherein the chemical bond is formed by a reaction of a first non-photopolymerizable functional group of the photopolymerizable compound and a second non-photopolymerizable functional group bonded to the flame retardant material.

7. The microlattice structure of claim 6, wherein the polymer at least partially surrounds the flame retardant material.

8. The microlattice structure of claim 7, wherein the flame retardant material comprises particles comprising a material selected from alumina trihydrate, ammonium polyphosphate, red phosphorous, an organic phosphinate, melamine polyphosphate, borates, expandable graphite, a phosphorous based oligomer, and a mixture thereof.

9. The microlattice structure of claim 6, wherein the struts comprise a coating comprising the flame retardant material on the polymer.

10. The microlattice structure of claim 6, wherein the first non-photopolymerizable functional group is selected from an isocyanate group, a hydroxyl group, an amine group, a carboxylic acid group, an epoxy group, a silyl ether, and a combination thereof, and
wherein the second non-photopolymerizable functional group is selected from an isocyanate group, a hydroxyl group, an amine group, a carboxylic acid group, an epoxy group, and a combination thereof.

11. A method of forming a microlattice structure, the method comprising:
exposing a composition comprising a photopolymerizable compound and a flame retardant material to collimated light to form a precursor-microlattice structure; and
curing the precursor-microlattice structure to form the microlattice structure,
wherein the curing of the precursor-microlattice structure forms a chemical bond between the flame retardant material and a polymer comprising a reaction product of the photopolymerizable compound, and
wherein the chemical bond is formed by a reaction of a first non-photopolymerizable functional group of the photopolymerizable compound and a second non-photopolymerizable functional group bonded to the flame retardant material.

12. The method of claim 11, wherein a photopolymerizable functional group is bonded to the flame retardant material and the exposing of the composition copolymerizes the flame retardant material with the photopolymerizable compound.

13. The method of claim 11, wherein the flame retardant material is included in the composition in an amount of 1 to 33 wt % based on the total weight of the composition.

14. The method of claim 11, wherein the exposing of the composition polymerizes the photopolymerizable compound to form the polymer.

* * * * *